US012766453B2

(12) United States Patent
Komiya et al.

(10) Patent No.: US 12,766,453 B2
(45) Date of Patent: Oct. 20, 2026

(54) CYCLONIC, DUST-COLLECTING UNIT AND VACUUM CLEANER

(71) Applicant: MAKITA CORPORATION, Anjo (JP)

(72) Inventors: Kosuke Komiya, Anjo (JP); Junichi Iwakami, Anjo (JP); Kentaro Nakahara, Anjo (JP)

(73) Assignee: Makita Corporation, Anjo (JP)

( * ) Notice: Subject to any disclaimer, the term of this patent is extended or adjusted under 35 U.S.C. 154(b) by 545 days.

(21) Appl. No.: 18/163,336

(22) Filed: Feb. 2, 2023

(65) Prior Publication Data

US 2023/0264131 A1 Aug. 24, 2023

(30) Foreign Application Priority Data

Feb. 18, 2022 (JP) ................................ 2022-023973
Feb. 18, 2022 (JP) ................................ 2022-024092
Feb. 18, 2022 (JP) ................................ 2022-024093

(51) Int. Cl.
*B01D 46/42* (2006.01)
*A47L 9/00* (2006.01)
(Continued)

(52) U.S. Cl.
CPC ........ *B01D 46/4236* (2013.01); *A47L 9/0081* (2013.01); *A47L 9/127* (2013.01);
(Continued)

(58) Field of Classification Search
CPC ............ B01D 46/4236; B01D 39/1692; B01D 46/0005; B01D 46/24; B01D 2265/024;
(Continued)

(56) References Cited

U.S. PATENT DOCUMENTS 3,769,780 A * 11/1973 Kasten .................... B60R 21/26
55/482
4,162,904 A * 7/1979 Clay ....................... F01N 3/037
55/447
(Continued)

FOREIGN PATENT DOCUMENTS

JP 85324140 Y1 6/1978
JP 2002292227 A 10/2002
(Continued)

OTHER PUBLICATIONS

Office Action mailed Dec. 19, 2024, in related U.S. Appl. No. 18/163,302 and examined claims 1-20.
(Continued)

*Primary Examiner* — Dung H Bui
(74) *Attorney, Agent, or Firm* — J-TEK LAW PLLC; Jeffrey D. Tekanic; Scott T. Wakeman

(57) ABSTRACT

A cyclonic, dust-collecting unit includes: one or more air swirling members, which swirl(s) air; a dust cap, into which air that has passed through the swirling member(s) flows; and a filter unit, through which air that flows out of the dust cap passes. The filter unit includes: a prefilter; a sound-absorbing member, through which air that has passed through the prefilter flows; and a post filter, through which air that has passed through the sound-absorbing member flows.

19 Claims, 32 Drawing Sheets

(51) Int. Cl.

| | |
|---|---|
| *A47L 9/12* | (2006.01) |
| *A47L 9/14* | (2006.01) |
| *A47L 9/16* | (2006.01) |
| *A47L 9/24* | (2006.01) |
| *B01D 39/16* | (2006.01) |
| *B01D 46/00* | (2022.01) |
| *B01D 46/24* | (2006.01) |

(52) U.S. Cl.

CPC ........... *A47L 9/1463* (2013.01); *A47L 9/1608* (2013.01); *A47L 9/165* (2013.01); *A47L 9/1666* (2013.01); *A47L 9/1683* (2013.01); *A47L 9/242* (2013.01); *A47L 9/248* (2013.01); *B01D 39/1692* (2013.01); *B01D 46/0005* (2013.01); *B01D 46/24* (2013.01); *B01D 2265/024* (2013.01); *B01D 2265/06* (2013.01); *B01D 2273/28* (2013.01); *B01D 2279/55* (2013.01)

(58) Field of Classification Search

CPC ............ B01D 2265/06; B01D 2273/28; B01D 2279/55; B01D 2239/065; B01D 39/083; B01D 39/1676; A47L 9/0081; A47L 9/127; A47L 9/1463; A47L 9/1608; A47L 9/165; A47L 9/1666; A47L 9/1683; A47L 9/242; A47L 9/248; A47L 5/24; A47L 9/22

See application file for complete search history.

(56) References Cited

U.S. PATENT DOCUMENTS

| | | | | |
|---|---|---|---|---|
| 4,581,050 | A * | 4/1986 | Krantz | A47L 9/165 55/432 |
| 5,567,127 | A * | 10/1996 | Wentz | F04D 29/663 417/423.9 |
| 5,762,689 | A * | 6/1998 | Hunziker | B01D 46/24 55/351 |
| 6,115,881 | A | 9/2000 | Hult et al. | |
| 6,293,981 | B1 * | 9/2001 | Holderle | F02M 35/024 55/497 |
| 6,431,607 | B1 | 8/2002 | Kittelmann et al. | |
| 6,857,165 | B2 | 2/2005 | Oh | |
| 7,282,074 | B1 * | 10/2007 | Witter | B24B 55/06 451/87 |
| 9,980,618 | B2 | 5/2018 | Koura et al. | |
| 11,602,708 | B1 * | 3/2023 | Solberg | B01D 46/2414 |
| 12,053,141 | B2 | 8/2024 | McClay et al. | |
| 2004/0123418 | A1 | 7/2004 | Jung | |
| 2005/0274094 | A1 * | 12/2005 | DeMarco | B01D 50/20 55/356 |
| 2005/0279571 | A1 * | 12/2005 | Marocco | F01N 13/04 181/270 |
| 2006/0042202 | A1 * | 3/2006 | Lee | A47L 9/0081 55/289 |
| 2008/0245719 | A1 * | 10/2008 | Beard | B01D 36/003 210/443 |
| 2009/0044702 | A1 * | 2/2009 | Adamek | B01D 46/546 55/486 |
| 2013/0305930 | A1 * | 11/2013 | Oh | F02M 35/02425 96/385 |
| 2014/0056738 | A1 | 2/2014 | Takahashi | |
| 2014/0090563 | A1 | 4/2014 | Robertson et al. | |
| 2014/0150388 | A1 | 6/2014 | Girondi | |
| 2014/0208539 | A1 * | 7/2014 | Ashbee | B04C 5/28 55/309 |
| 2014/0208704 | A1 * | 7/2014 | Hill | B01D 46/56 55/483 |
| 2015/0223652 | A1 * | 8/2015 | Koura | A47L 5/365 15/327.2 |
| 2016/0051909 | A1 | 2/2016 | Fedak | |
| 2017/0209014 | A1 | 7/2017 | Stickney | |
| 2017/0304759 | A1 | 10/2017 | Foenss et al. | |
| 2018/0289227 | A1 * | 10/2018 | Takano | A47L 5/24 |
| 2020/0064018 | A1 * | 2/2020 | Fitzsimmons | F24F 13/24 |
| 2020/0107686 | A1 * | 4/2020 | Grey | A47L 9/127 |
| 2020/0253441 | A1 | 8/2020 | Acker et al. | |
| 2020/0397200 | A1 * | 12/2020 | McRorie | A47L 9/1683 |
| 2021/0154610 | A1 * | 5/2021 | Carredo | A62B 23/02 |
| 2021/0228040 | A1 | 7/2021 | Mitsui et al. | |
| 2021/0228041 | A1 | 7/2021 | Yamada | |
| 2021/0274990 | A1 | 9/2021 | Mitsui et al. | |
| 2021/0321844 | A1 * | 10/2021 | Seasholtz | B01D 46/4227 |
| 2021/0401246 | A1 * | 12/2021 | Conrad | A47L 9/122 |
| 2022/0118398 | A1 * | 4/2022 | Alagouda | B01D 46/2414 |
| 2022/0240741 | A1 | 8/2022 | Ichihashi et al. | |
| 2023/0114528 | A1 * | 4/2023 | Bito | A47L 9/1683 15/347 |
| 2023/0263349 | A1 | 8/2023 | Komiya et al. | |
| 2023/0263352 | A1 | 8/2023 | Komiya et al. | |
| 2023/0292972 | A1 | 9/2023 | Li et al. | |
| 2023/0301478 | A1 * | 9/2023 | Escalettes | B01D 46/0005 |
| 2023/0371764 | A1 * | 11/2023 | Escalettes | A47L 9/2884 |
| 2025/0025004 | A1 * | 1/2025 | Perchaud | A47L 5/24 |

FOREIGN PATENT DOCUMENTS

| | | | |
|---|---|---|---|
| JP | 2003250734 | A | 9/2003 |
| JP | 2006346141 | A | 12/2006 |
| JP | 2011131014 | A | 7/2011 |
| JP | 2015150149 | A | 8/2015 |
| JP | 2016067664 | A | 5/2016 |
| JP | 2016112076 | A | 6/2016 |
| JP | 2016153054 | A | 8/2016 |
| JP | 2017000393 | A | 1/2017 |
| JP | 2017196411 | A | 11/2017 |
| JP | 2019000255 | A | 1/2019 |
| JP | 2020116184 | A | 8/2020 |
| JP | 2021166595 | A | 10/2021 |
| JP | 2021171325 | A | 11/2021 |
| KR | 200489333 | Y1 | 6/2019 |
| WO | 2019065085 | A1 | 4/2019 |
| WO | 2021079237 | A1 | 4/2021 |

OTHER PUBLICATIONS

Instruction Manual for Makita Cordless Cleaner Model No. GLC03, published online Aug. 2022.

Unpublished U.S. Appl. No. 18/163,301.

Unpublished U.S. Appl. No. 18/163,302.

Office Action from the Japanese Patent Office dispatched Jul. 8, 2025 in counterpart Japanese application No. 2022-024093, and translation thereof.

Office Action from the Japanese Patent Office dispatched Jun. 24, 2025 in counterpart Japanese application No. 2022-023973, and translation thereof.

Office Action from the Japanese Patent Office dispatched Jun. 24, 2025 in counterpart Japanese application No. 2022-024092, and translation thereof.

Office Action from the Japanese Patent Office dispatched Nov. 18, 2025, in counterpart Japanese application No. 2022-023973, and translation thereof.

Office Action from the United States Patent Office mailed May 27, 2025 in related U.S. Appl. No. 18/163,302, including examined claims 1-20.

Office Action mailed Aug. 14, 2025, in related U.S. Appl. No. 18/163,301, and examined claims 1-20.

Office Action mailed Feb. 19, 2026, in related U.S. Appl. No. 18/163,301, and examined claims 1-3, 5-18 and 21-23.

* cited by examiner

CYCLONIC, DUST-COLLECTING UNIT AND VACUUM CLEANER

CROSS-REFERENCE

This application claims priority to: Japanese Patent Application No. 2022-024092 filed on Feb. 18, 2022, Japanese Patent Application No. 2022-024093 filed on Feb. 18, 2022, and Japanese Patent Application No. 2022-023973 filed on Feb. 18, 2022, the contents of all of which are incorporated herein by reference.

TECHNICAL FIELD

The techniques disclosed in the present specification relate to a cyclonic, dust-collecting unit and to a vacuum cleaner, hereinafter referred to simply as a "cleaner".

BACKGROUND ART

A known cyclonic, dust-collecting apparatus is disclosed in Japanese Laid-open Patent Publication No. 2003-250734.

SUMMARY

Noise generated by a vacuum cleaner can be discomforting to the user of the vacuum cleaner and to people in the vicinity thereof.

It is one non-limiting object of the present teachings to disclose techniques for reducing the amount of noise generated by a vacuum cleaner.

In one non-limiting aspect of the present teachings, a cyclonic, dust-collecting unit for a vacuum cleaner may comprise: one or more swirling members (air swirling member(s)), which swirl(s) air; a dust cap (dust case), into which air that has passed through the swirling member(s) flows; and a filter unit, through which air that flows out of the dust cap passes. The filter unit may comprise: a prefilter; a sound-absorbing member, through which air that has passed through the prefilter flows; and a post filter, through which air that has passed through the sound-absorbing member flows.

According to the techniques disclosed in the present specification, noise generated by a vacuum cleaner can be reduced.

DETAILED DESCRIPTION

Figure 1:
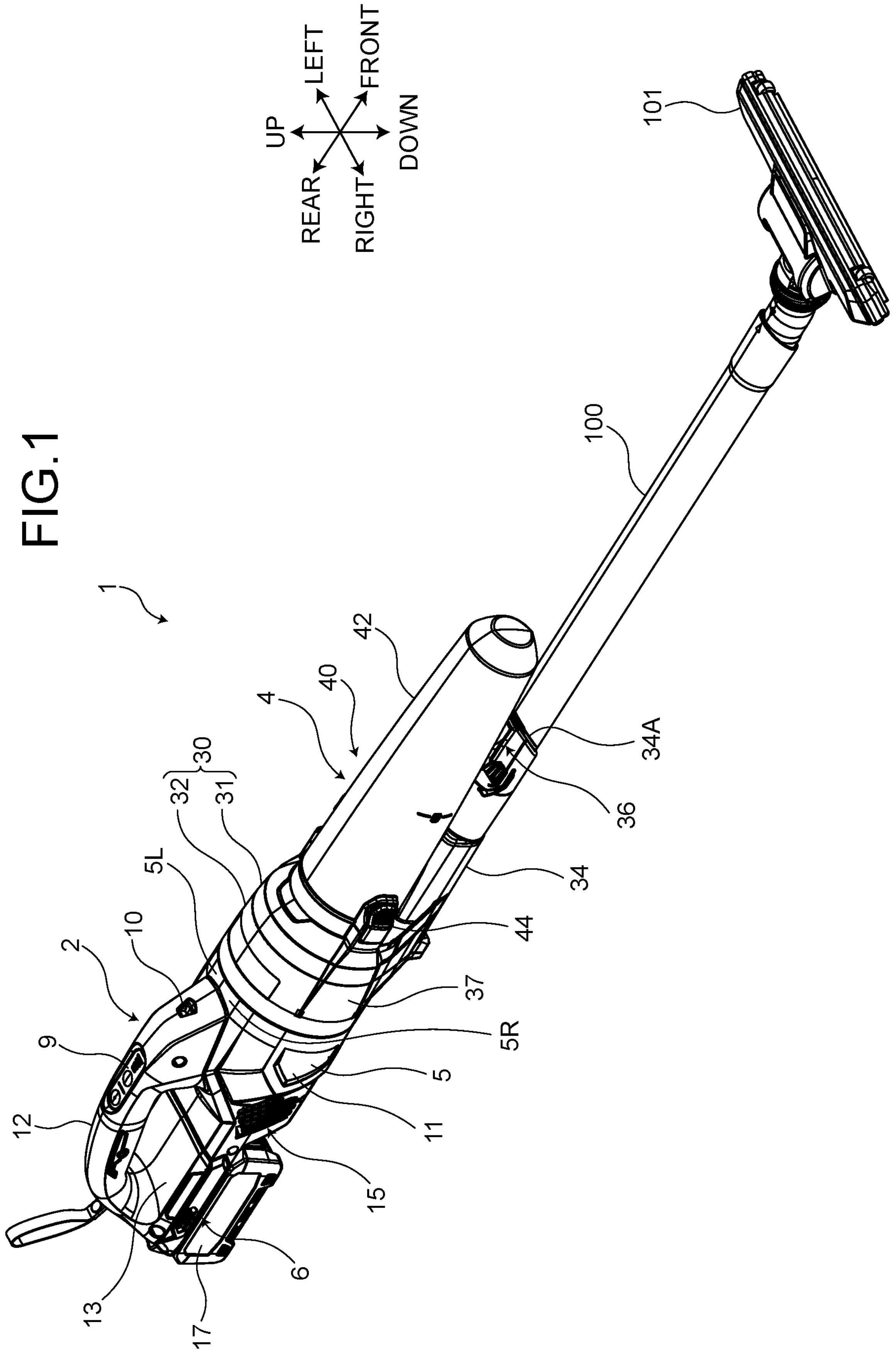
FIG. 1 is an oblique view, viewed from the front, that shows a cleaner (stick vacuum cleaner) and an extension pipe (wand) according to one representative, non-limiting embodiment of the present teachings.

As was mentioned above, in one or more embodiments, a cyclonic, dust-collecting unit for a vacuum cleaner may comprise: one or more swirling members, which swirl(s) air; a dust cap (dust case), into which air that has passed through the swirling member(s) flows; and a filter unit, through which air that flows out of the dust cap passes. The filter unit may comprise: a prefilter; a sound-absorbing member, through which air that has passed through the prefilter flows;

and a post filter, through which air that has passed through the sound-absorbing member flows.

According to the above-mentioned configuration, air that flows out of the dust cap passes through the sound-absorbing member before passing through the post filter. Therefore, air that swirls through the interior of the dust cap does not directly contact the post filter. Consequently, noise generated by the post filter is curtailed. In addition, air that flows out of the dust cap passes through the prefilter before passing through the sound-absorbing member. Consequently, adherence of foreign matter that is in the interior of the dust cap to the sound-absorbing member is curtailed.

In one or more embodiments, the prefilter, the sound-absorbing member, and the post filter may each have holes through which air passes. The size of the holes in the prefilter may be smaller than the size of the holes in the sound-absorbing member. The size of the holes in the sound-absorbing member may be smaller than the size of the holes in the post filter.

According to the above-mentioned configuration, air that flows out of the dust cap passes through the holes in the sound-absorbing member, which are smaller than the holes in the post filter, before passing through the holes in the post filter. Noise generated by the post filter is curtailed because the size of the holes in the sound-absorbing member is smaller than the size of the holes in the post filter. In addition, air that flows out of the dust cap passes through the holes in the prefilter, which is smaller than the holes in the sound-absorbing member, before passing through the holes in the sound-absorbing member. Adherence of foreign matter that is in the interior of the dust cap to the sound-absorbing member is curtailed because the size of the holes in the prefilter is smaller than the size of the holes in the sound-absorbing member.

In one or more embodiments, the post filter may comprise a filter-tube part. The sound-absorbing member may be disposed around the filter-tube part. At least a portion of the prefilter may be disposed around the sound-absorbing member.

According to the above-mentioned configuration, after air in the interior of the dust cap has passed through the prefilter and has passed through the sound-absorbing member, it can pass through the post filter. Noise generated by the post filter is curtailed because the filter-tube part of the post filter is covered by the sound-absorbing member. Adherence of foreign matter that is in the interior of the dust cap to the sound-absorbing member is curtailed because the sound-absorbing member is covered by the prefilter.

In one or more embodiments, an outer surface of the filter-tube part and an inner surface of the sound-absorbing member may (directly) contact each other. An outer surface of the sound-absorbing member and an inner surface of the prefilter may (directly) contact each other.

According to the above-mentioned configuration, the filter unit may be embodied in a compact manner.

In one or more embodiments, the sound-absorbing member may be sandwiched between the prefilter and the post filter.

According to the above-mentioned configuration, the sound-absorbing member is fixed to both (secured or held between) the prefilter and the post filter by the sandwiching of the sound-absorbing member between the prefilter and the post filter.

In one or more embodiments, the post filter may comprise one or more filter-hook parts, which is (are) provided on one-end portion of the filter-tube part in the axial direction. The prefilter may comprise a filter-coupling part, which is provided on one-end portion of the prefilter in the axial direction and on which the filter-hook part(s) is (are) hooked.

According to the above-mentioned configuration, the prefilter and the post filter are fixed (secured, held, latched) to each other by hooking the filter-hook part(s) of the post filter to (in) the filter-coupling part of the prefilter.

In one or more embodiments, the prefilter, the sound-absorbing member, and the post filter may be separable from each other.

According to the above-mentioned configuration, the prefilter, the sound-absorbing member, and the post filter can be separated by removing the filter-hook part(s) from the filter-coupling part. Then, the user of the cleaner can more easily perform maintenance on (e.g., clean) the prefilter, the sound-absorbing member, and the post filter by first separating the prefilter, the sound-absorbing member, and the post filter before performing the maintenance, such as cleaning.

In one or more embodiments, the prefilter may comprise a circular-tube-shaped (hollow cylindrical) mesh member.

According to the above-mentioned configuration, adherence of foreign matter that is in the interior of the dust cap to the prefilter is curtailed. However, even if foreign matter has adhered to a surface of the prefilter, the user of the cleaner can easily remove the foreign matter that has adhered to the surface of the prefilter.

In one or more embodiments, the mesh member may be made of a nylon (polyamide).

According to the above-mentioned configuration, adherence of foreign matter that is in the interior of the dust cap to the prefilter is curtailed.

In one or more embodiments, the prefilter may comprise a filter frame, which supports the mesh member.

According to the above-mentioned configuration, deformation of the mesh member is curtailed because the mesh member is supported on the filter frame.

In one or more embodiments, the mesh member and the filter frame may be integrated as one body (e.g., a unit having the mesh member and filter frame attached to each other).

According to the above-mentioned configuration, changes in the relative position between the mesh member and the filter frame can be minimized or even eliminated.

In one or more embodiments, the filter frame may comprise: a first fixing part, which is fixed to one-end portion of the mesh member in the axial direction; a second fixing part, which is fixed to the other-end portion of the mesh member in the axial direction; and a frame-coupling part, which connects the first fixing part and the second fixing part.

According to the above-mentioned configuration, deformation of the mesh member is curtailed. In addition, air in the interior of the dust cap can pass through the mesh member between the first fixing part, the second fixing part, and the frame-coupling part.

In one or more embodiments, the sound-absorbing member may comprise a circular-tube-shaped (hollow cylindrical) sponge member.

According to the above-mentioned configuration, noise generated by the post filter can be curtailed effectively because the sound-absorbing member is a sponge member. In addition, the user of the cleaner can smoothly (easily) mount the sound-absorbing member on the post filter.

In one or more embodiments, the sponge member may be made of a foamed urethane.

According to the above-mentioned configuration, noise generated by the post filter is curtailed effectively. In addition, the user of the cleaner can smoothly (easily) mount the sound-absorbing member on the post filter.

In one or more embodiments, the post filter may comprise the filter-tube part and a filter-cover part, which covers an opening in one-end portion of the filter-tube part in the axial direction. A hole, through which air passes, may be provided in the filter-tube part.

According to the above-mentioned configuration, after air in the interior of the dust cap has passed through the prefilter and has passed through the sound-absorbing member, it can pass through the filter-tube part of the post filter. Noise generated by the post filter is curtailed because the filter-tube part of the post filter is covered by the sound-absorbing member. Adherence of foreign matter that is in the interior of the dust cap to the sound-absorbing member is curtailed because the sound-absorbing member is covered by the prefilter.

In one or more embodiments, the air that has passed through the hole in the filter-tube part may flow out of an outflow port in the other-end portion of the filter-tube part in the axial direction.

According to the above-mentioned configuration, after air that has flowed into the dust cap has flowed through the filter unit, it flows out of the outflow port on the other-end portion of the filter-tube part in the axial direction.

In one or more embodiments, the post filter may be made from an acrylonitrile butadiene styrene (ABS) resin (polymer).

According to the above-mentioned configuration, sufficient strength of the filter unit is ensured.

An embodiment according to the present disclosure is explained below, with reference to the drawings, but the present disclosure is not limited to the embodiment. The structural elements of the embodiment explained below can be combined where appropriate. In addition, there are also situations in which some of the structural elements are not used.

In the embodiment, positional relationships among parts will be explained using the terms “front,” “rear,” “left,” “right,” “up,” and “down.” Each of these terms indicates a relative position or a direction, using the center of a cleaner (stick vacuum cleaner) 1 as a reference.

Overview of Cleaner

Figure 2:
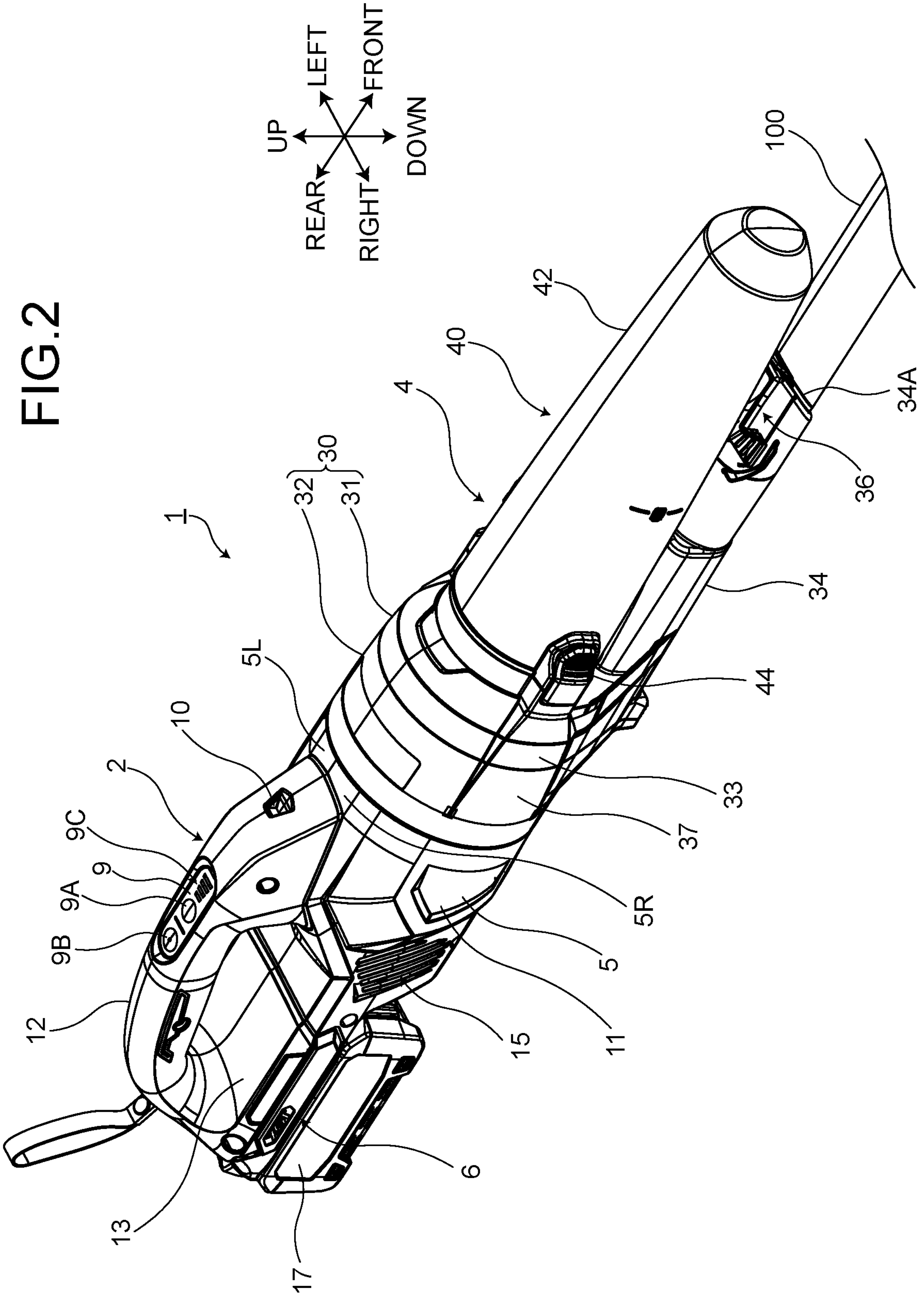
FIG. 2 is an oblique view, viewed from the front, that shows the cleaner according to the embodiment.
Figure 3:
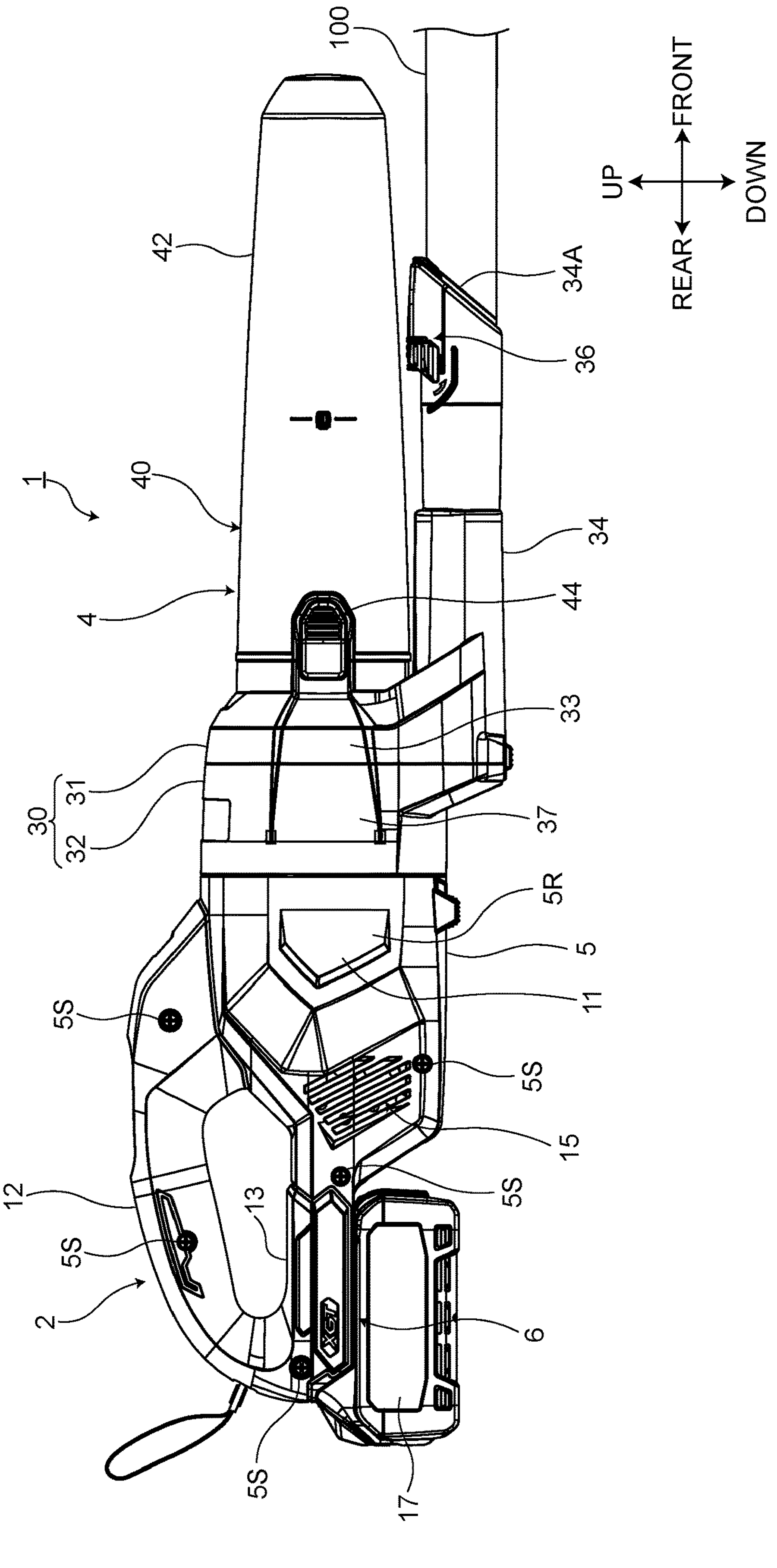
FIG. 3 is a side view that shows the cleaner according to the embodiment.
Figure 4:
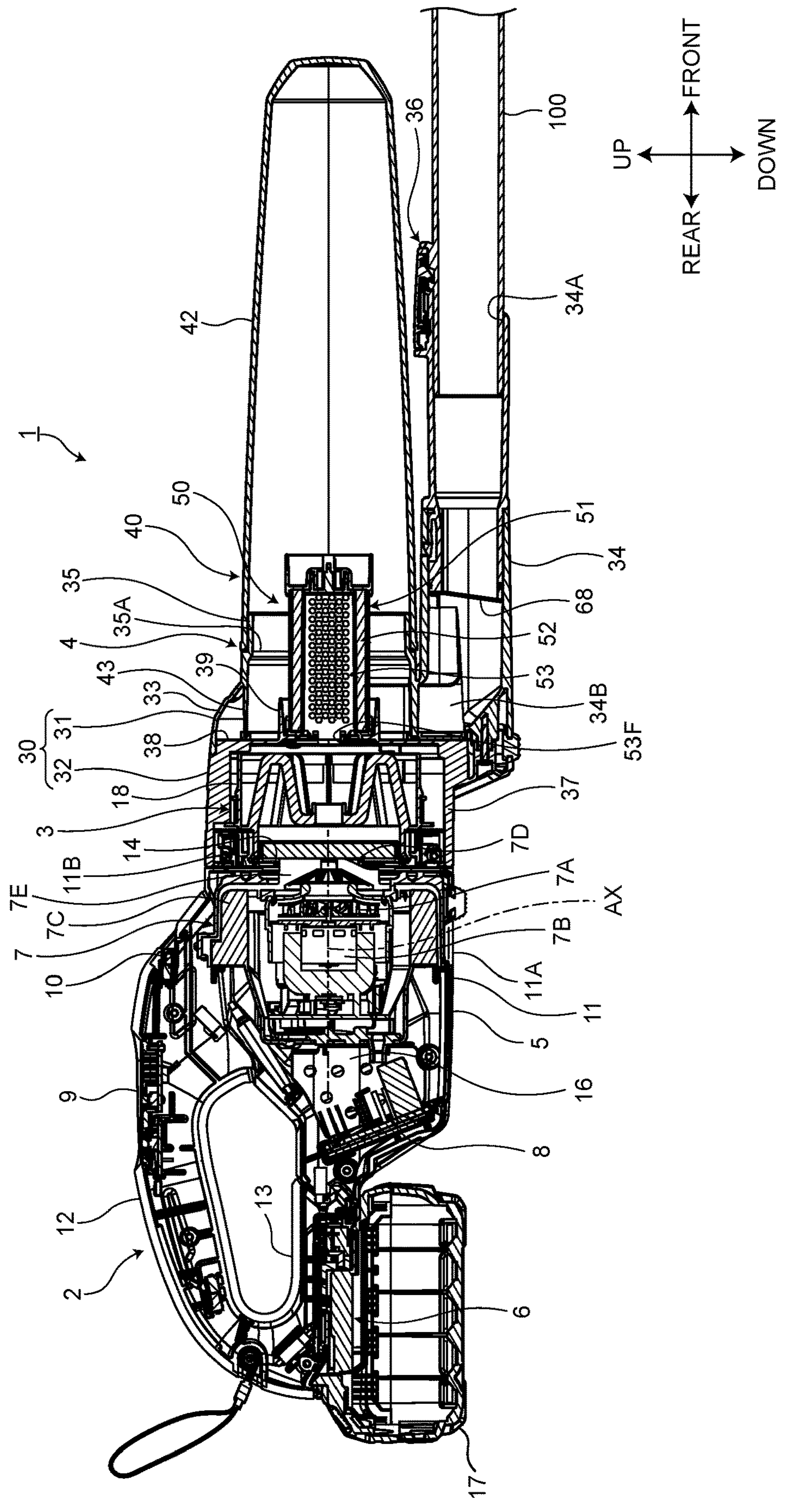
FIG. 4 is a cross-sectional view that shows the cleaner according to the embodiment.
Figure 5:
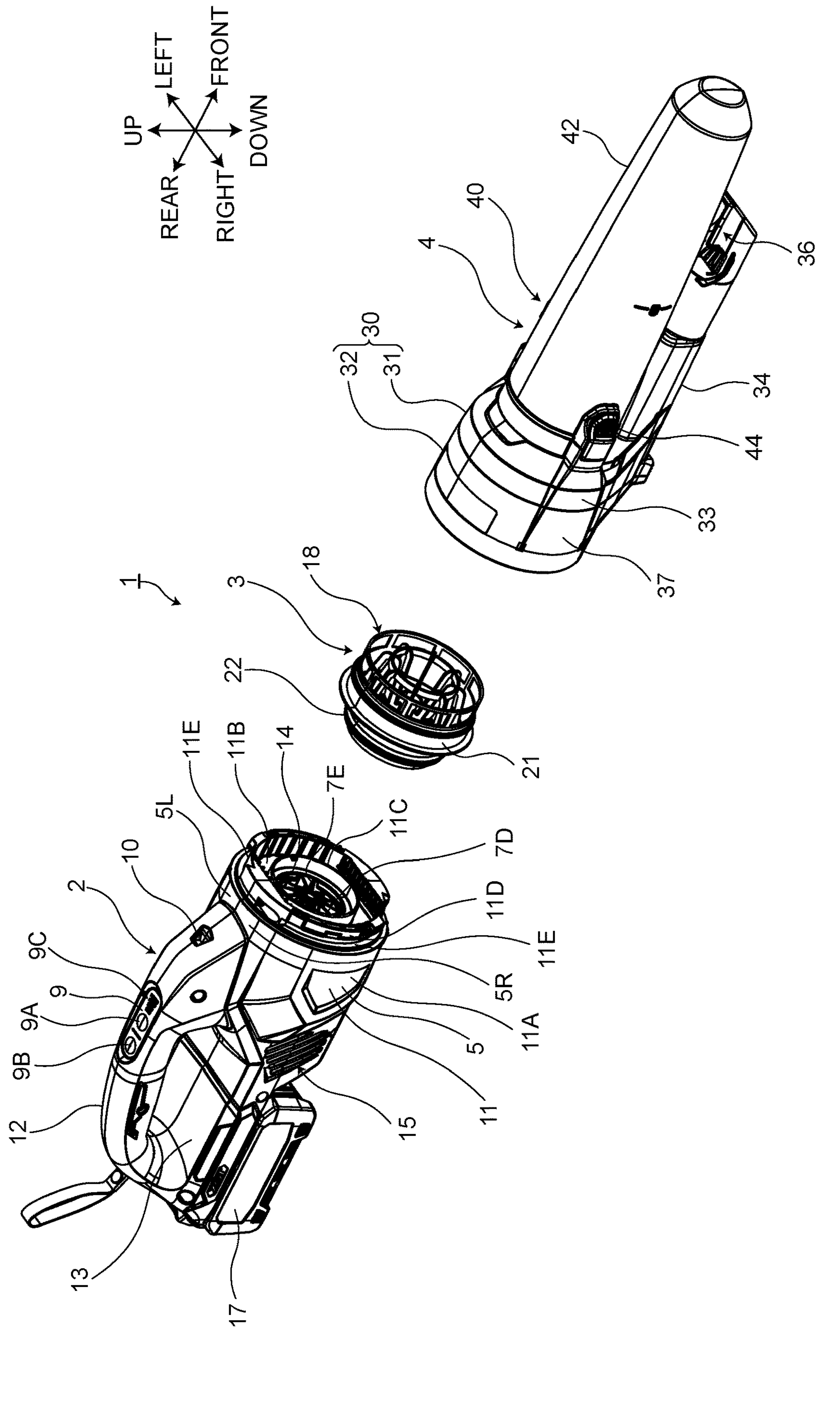
FIG. 5 is an exploded, oblique view, viewed from the front, that shows the cleaner according to the embodiment.

FIG. 1 is an oblique view, viewed from the front, that shows the cleaner 1 and an extension pipe (extension wand) 100 according to one representative, non-limiting embodiment of the present teachings. FIG. 2 is an oblique view, viewed from the front, that shows the cleaner 1 according to the embodiment. FIG. 3 is a side view that shows the cleaner 1 according to the embodiment. FIG. 4 is a cross-sectional view that shows the cleaner 1 according to the embodiment. FIG. 5 is an exploded, oblique view, viewed from the front, that shows the cleaner 1 according to the embodiment.

In the embodiment, the cleaner 1 is a cyclonic cleaner (also known as a cyclone vacuum cleaner) that separates foreign matter (e.g., dust, debris, etc.) from air using centrifugal force. The cleaner 1 comprises a main-body assembly 2, a filter assembly 3, and a dust-collecting assembly 4. A base-end portion of the extension pipe 100 is coupled to the dust-collecting assembly 4. A suction nozzle 101 is coupled to a tip portion of the extension pipe 100. The suction nozzle 101 has an inlet port.

Main-Body Assembly

Figure 6:
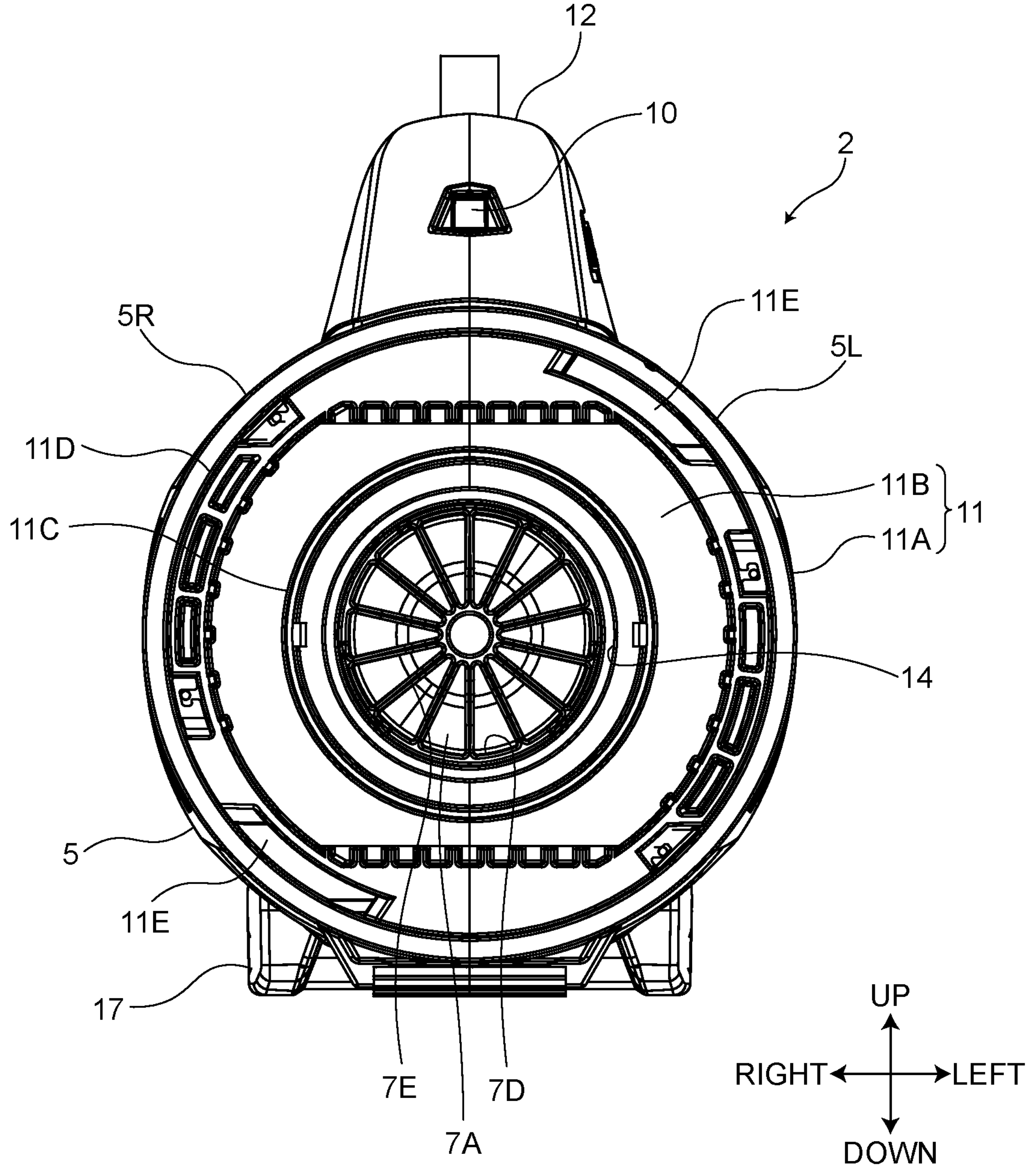
FIG. 6 is a drawing, viewed from the front, of a main-body assembly according to the embodiment.

FIG. 6 is a drawing, viewed from the front, of the main-body assembly 2 according to the embodiment. As shown in FIGS. 1-6, the main-body assembly 2 comprises a main-body housing 5, a battery-mounting part 6, a suction unit 7, a controller 8, an operation panel 9, and a light 10.

The main-body housing 5 is formed of a synthetic resin (polymer). The main-body housing 5 comprises a pair of half housings. The main-body housing 5 comprises a left housing 5L and a right housing 5R. The right housing 5R is disposed more rightward than the left housing 5L. The left housing 5L and the right housing 5R are fixed to each other by a plurality of screws 5S.

The main-body housing 5 comprises a body part 11, a grip part (grip, handle) 12, and a battery-holding part (battery mount) 13.

The body part 11 houses the suction unit 7. The suction unit 7 is disposed in the interior space of the body part 11. The body part 11 comprises a side-plate part 11A, a front-plate part 11B, an inner-tube part 11C, and an outer-tube part 11D.

The side-plate part 11A is disposed such that it surrounds the suction unit 7. The front-plate part 11B is disposed at a front portion of the side-plate part 11A. The inner-tube part 11C and the outer-tube part 11D are each provided on the front-plate part 11B. The inner-tube part 11C protrudes forward from a front surface of the front-plate part 11B. The outer-tube part 11D protrudes forward from the front surface of the front-plate part 11B. The outer-tube part 11D is disposed around the inner-tube part 11C.

The body part 11 has a suction port 14 and air-exhaust ports 15. The suction port 14 is provided in a front portion of the main-body assembly 2. In the embodiment, the suction port 14 is provided in a center portion of the front-plate part 11B. The inner-tube part 11C is disposed around the suction port 14. The air-exhaust ports 15 are provided in a left portion and in a right portion of the side-plate part 11A.

In the embodiment, a sound-absorbing member 16 is disposed in the interior space of the main-body housing 5. The sound-absorbing member 16 is disposed in the interior space of the body part 11 such that the sound-absorbing member 16 faces the air-exhaust ports 15. The sound-absorbing member 16 is a porous member. The sound-absorbing member 16 absorbs sound that propagates through the air, thereby curtailing (attenuating) the generation of noise.

Grooves 11E are provided on the outer surface of the outer-tube part 11D. Two of the grooves 11E are provided on the outer surface of the outer-tube part 11D. The grooves 11E are formed such that they extend in the circumferential direction of rotational axis AX. Each of the two grooves 11E has an arcuate shape within a plane orthogonal to rotational axis AX. Each of the grooves 11E is provided in a helical shape.

The grip part 12 is configured to be gripped by the user of the cleaner 1. The grip part 12 is provided such that it extends rearward from an upper portion of the body part 11.

The battery-holding part 13 holds (mounts) a battery pack 17 via the battery-mounting part 6. The battery-holding part 13 is connected to a rear portion of the body part 11 and to a lower-end portion of a rear portion of the grip part 12.

The battery-mounting part 6 is provided at a lower portion of the battery-holding part 13. The battery pack 17 is mounted on the battery-mounting part 6. The battery pack 17 is detachable from the battery-mounting part 6.

The battery pack 17 functions as the power supply of the cleaner 1. When the battery pack 17 is mounted on the battery-mounting part 6, the battery pack 17 supplies electric power to the cleaner 1. The battery pack 17 is a general-purpose rechargeable battery that is capable of being used, e.g., as the power supply of various electrical devices. The battery pack 17 is capable of being used as the power supply of a power tool. The battery pack 17 is capable of being used as the power supply of an electrical device other than a power tool. The battery pack 17 is capable of being used as the power supply of a cleaner other than the cleaner 1 according to the embodiment. The battery pack 17 comprises one or more lithium-ion battery cells. The battery pack 17 is thus a rechargeable battery. The battery-mounting part 6 has a structure equivalent to that of a battery-mounting part of a power tool.

The user of the cleaner 1 can mount the battery-mounting part 6 on the battery pack 17 and remove the battery pack 17 from the battery-mounting part 6. The battery-mounting part 6 comprises guide members (rails), which guide the battery pack 17, and main-body terminals, which are electrically connectable to battery terminals provided on the battery pack 17. The user can mount the battery pack 17 on the battery-mounting part 6 by inserting the battery pack 17 into the battery-mounting part 6 from the rear. The battery pack 17 is inserted into the battery-mounting part 6 while being guided by the guide members. When the battery pack 17 is mounted on the battery-mounting part 6, the battery terminals of the battery pack 17 and the main-body terminals of the battery-mounting part 6 are electrically connected to each other. The user of the cleaner 1 can remove the battery pack 17 from the battery-mounting part 6 by moving the battery pack 17 rearward.

The suction unit 7 generates a suction force at the suction port 14. The suction unit 7 is housed in the body part 11. The suction unit 7 comprises a fan 7A, a motor 7B, and a motor case 7C, which houses the fan 7A and the motor 7B. The fan 7A is rotatable about rotational axis AX. Rotational axis AX extends in the front-rear direction. The motor 7B generates motive power, which causes the fan 7A to rotate. The motor 7B is a DC brushless motor. The motor 7B comprises: a stator, which has a tube shape; a rotor, which is disposed in the interior of the stator; and a rotor shaft, which extends forward from the rotor. The rotor shaft is fixed to the rotor. The fan 7A is fixed to the rotor shaft. Rotational axis AX of the rotor of the motor 7B and rotational axis AX of the fan 7A coincide with each other. The fan 7A rotates about rotational axis AX owing to the rotation of the rotor of the motor 7B about rotational axis AX.

An opening 7D is provided in a front portion of the motor case 7C. The motor case 7C has a plurality of ribs 7E disposed in the opening 7D. The ribs 7E are disposed such that they extend radially from the center of the opening 7D. A portion of the motor case 7C that includes the opening 7D is disposed in the suction port 14 of the front-plate part 11B. A suction force is generated at the opening 7D by rotation of the fan 7A. The generation of a suction force at the suction port 14 includes the generation of a suction force at the opening 7D. The air suctioned in the suction port 14 by the rotation of the fan 7A flows into the interior space of the motor case 7C via the opening 7D. The air that flows into the interior space of the motor case 7C passes through the interior space of the motor case 7C, after which it flows out to the exterior space of the main-body housing 5 via the air-exhaust ports 15.

The controller 8 controls at least the motor 7B. The controller 8 is housed in the body part 11. The controller 8 comprises a circuit board, on which a plurality of electronic parts is mounted. A processor (e.g., one or more microprocessors), such as a CPU (central processing unit); nonvolatile memory, such as ROM (read-only memory) and storage; volatile memory, such as RAM (random-access memory); transistors; and resistors are illustrative examples of the electronic parts mounted on the circuit board.

The operation panel 9 is configured to be manipulated by the user of the cleaner 1. The operation panel 9 is disposed on the grip part 12. The user can manipulate the operation panel 9 while grasping the grip part 12. In the embodiment, the operation panel 9 comprises a drive-mode changing button 9A, which is for changing the drive condition (e.g., rotational speed) of the motor 7B, and a drive button 9B, which is for causing the motor 7B to operate (start and stop). When the motor 7B is in the stopped state and the drive button 9B is manipulated (pressed), operation of the motor 7B is started. A suction force is generated at the suction port 14 by operation of the motor 7B. When the motor 7B is operating and the drive-mode changing button 9A is manipulated (pressed), the rotational speed of the motor 7B is adjusted (changed) in, for example, four steps. When the motor 7B is operating and the drive-mode changing button 9A is manipulated once, the rotational speed of the motor 7B changes from a first rotational speed to a (e.g. higher) second rotational speed; when manipulated once more, the rotational speed of the motor 7B changes from the second rotational speed to a (e.g. higher) third rotational speed; when manipulated once more, the rotational speed of the motor 7B changes from the third rotational speed to a (e.g. higher) fourth rotational speed; and when manipulated once more, the rotational speed of the motor 7B changes back to the first rotational speed. The suction force at the suction port 14 changes by changing the rotational speed of the motor 7B. When the motor 7B is operating and the drive button 9B is manipulated (pressed) again, the motor 7B stops. In addition, the operation panel 9 comprises a plurality of light-emitting parts 9C that emit light in accordance with the rotational speed of the motor 7B; e.g., the light-emitting parts 9C are selectively illuminated to indicate low speed, medium speed or high speed operation.

The light 10 is disposed at a front portion of the grip part 12. The light 10 illuminates forward of the cleaner 1. The light 10 comprises one or more light-emitting devices such as one or more light-emitting diodes (LED).

Filter Assembly

As shown in FIG. 4 and FIG. 5, at least a portion of the filter assembly 3 is disposed more forward than the main-body assembly 2. The filter assembly 3 is disposed such that it opposes the suction port 14 of the main-body assembly 2.

Figure 7:
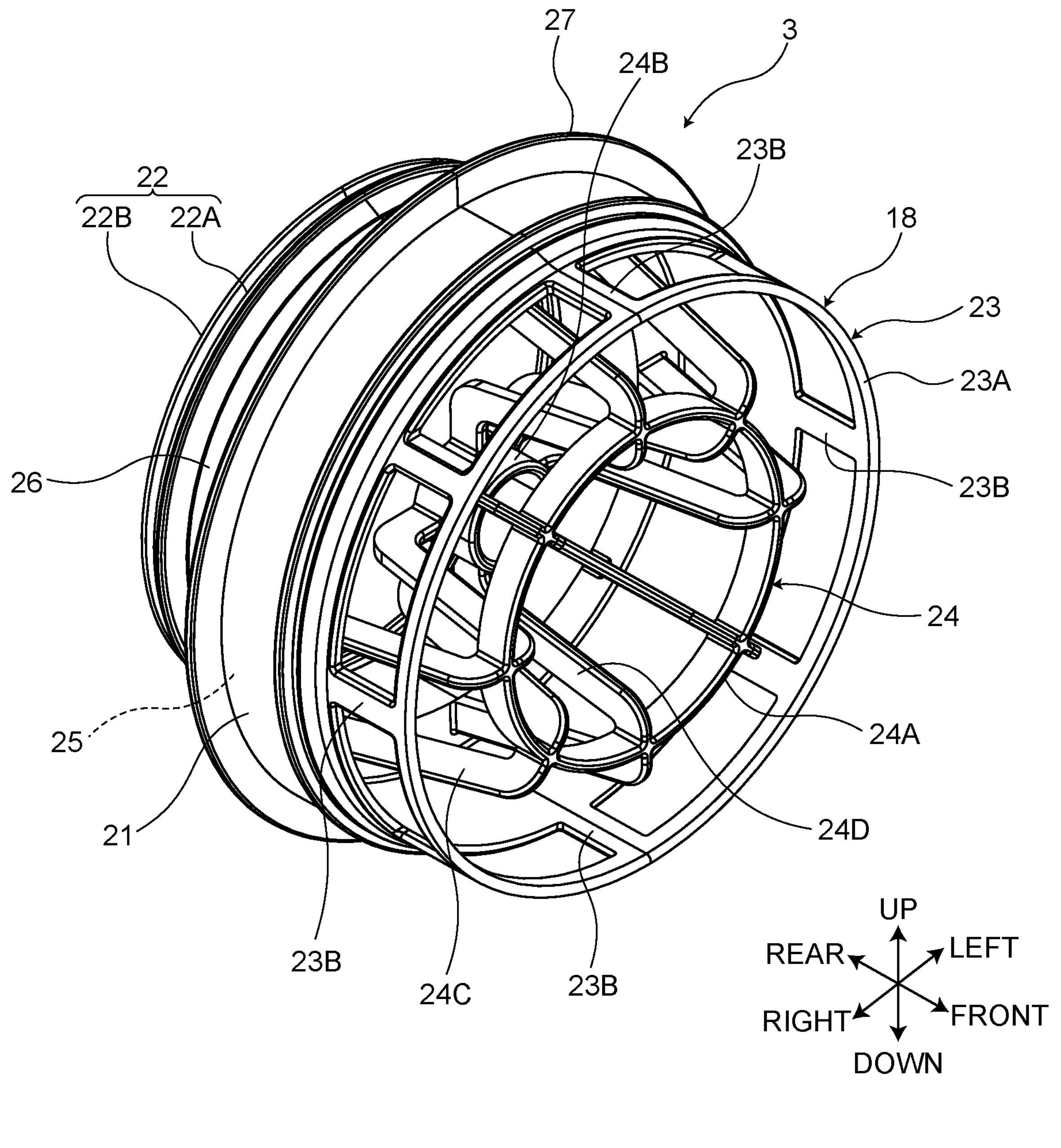
FIG. 7 is an oblique view, viewed from the front, that shows a filter assembly according to the embodiment.
Figure 8:
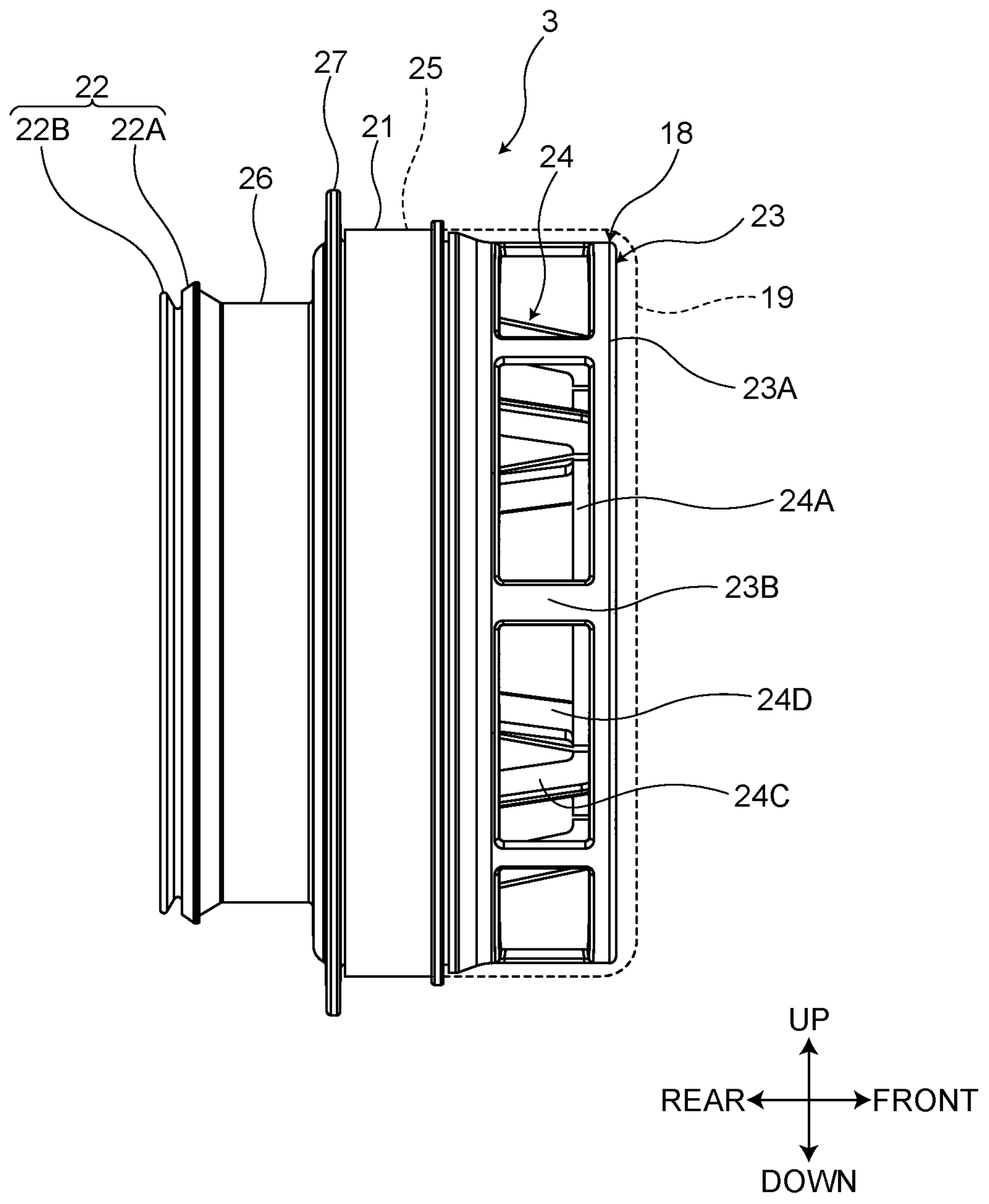
FIG. 8 is a side view that shows the filter assembly according to the embodiment.
Figure 9:
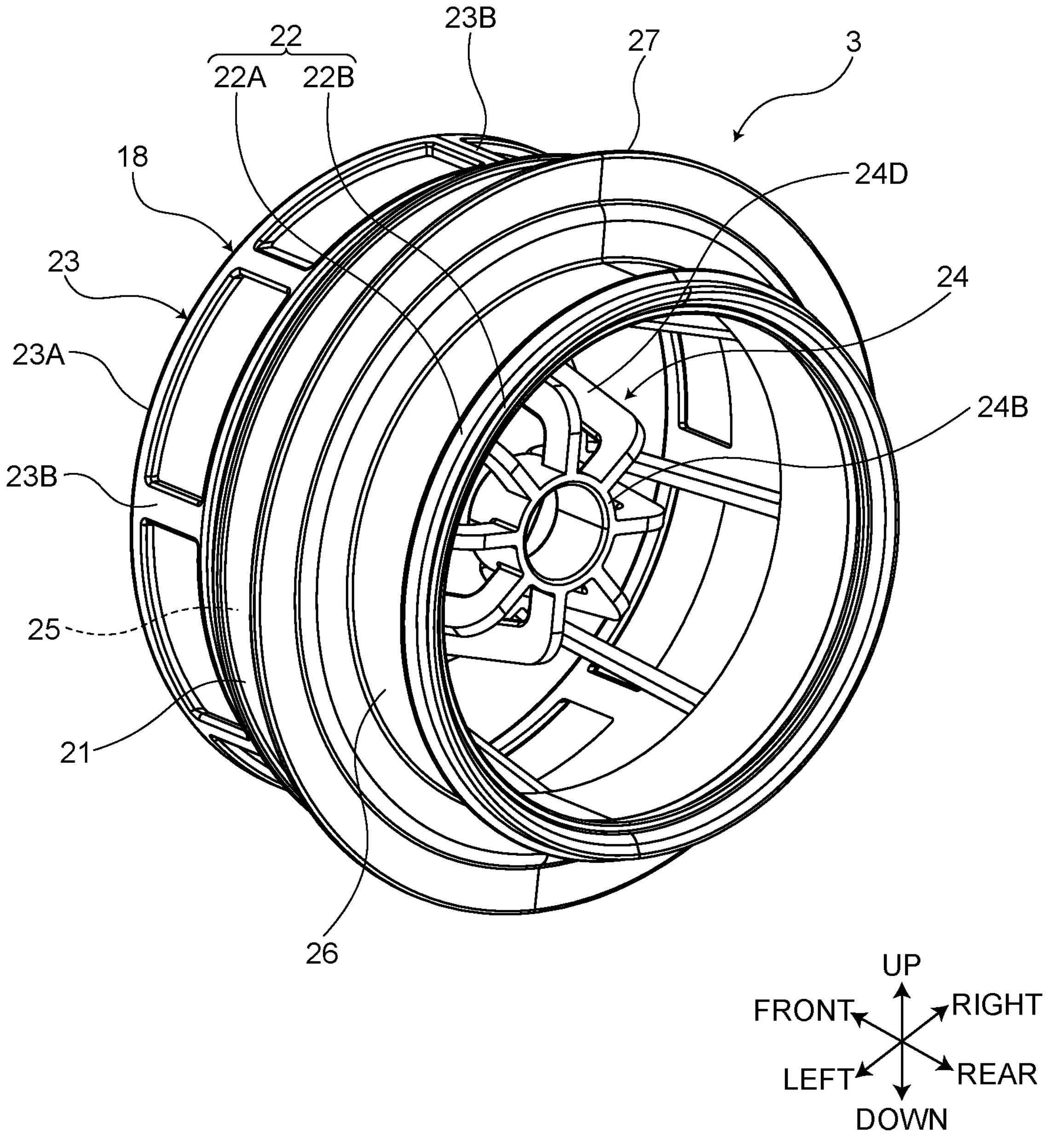
FIG. 9 is an oblique view, viewed from the rear, that shows the filter assembly according to the embodiment.

FIG. 7 is an oblique view, viewed from the front, that shows the filter assembly 3 according to the embodiment. FIG. 8 is a side view that shows the filter assembly 3 according to the embodiment. FIG. 9 is an oblique view, viewed from the rear, that shows the filter assembly 3 according to the embodiment.

As shown in FIG. 4, FIG. 5, FIG. 7, FIG. 8, and FIG. 9, the filter assembly 3 comprises a support frame 18, a filter 19, a filter-fixing member (filter holder, filter retainer) 21, and a retaining-rib member (circular or annular retaining rib) 22.

The support frame 18 supports the filter 19, as can be seen in FIG. 8. The support frame 18 comprises a first lattice part 23, a second lattice part 24, a front-side tube part 25, a rear-side tube part 26, and a support-rib part 27.

The first lattice part 23 comprises a first ring part 23A and first rod parts (beams, bars, struts) 23B, as can be seen in FIG. 7. The first ring part 23A is disposed more forward than the front-side tube part 25. The first rod parts 23B are provided such that they connect the first ring part 23A and the front-side tube part 25. A plurality of the first rod parts 23B is disposed in (around) the circumferential direction of the first ring part 23A in a spaced-apart manner.

The second lattice part 24 comprises a second ring part 24A, a third ring part 24B, second rod parts (beams, bars, struts) 24C, and third rod parts (beams, bars, struts) 24D. The second ring part 24A is disposed more forward than the front-side tube part 25. The third ring part 24B is disposed radially inward of the front-side tube part 25. The third ring part 24B is disposed more rearward than the second ring part 24A. The second rod parts 24C are provided such that they connect the second ring part 24A and the rear-side tube part 26. A plurality of the second rod parts 24C is disposed in the circumferential direction of the second ring part 24A in a spaced-apart manner. The third rod parts 24D are provided such that they connect the second ring part 24A and the third ring part 24B. A plurality of the third rod parts 24D is disposed in (around) the circumferential direction of the second ring part 24A in a spaced-apart matter.

The front-side tube part 25 has a circular-tube shape. The front-side tube part 25 is disposed more rearward than the first ring part 23A and the second ring part 24A.

The rear-side tube part 26 has a circular-tube shape (hollow circular cylindrical shape). The rear-side tube part 26 is disposed more rearward than the front-side tube part 25. The central axis of the front-side tube part 25 and the central axis of the rear-side tube part 26 coincide with each other. The outer diameter of the front-side tube part 25 is larger than the outer diameter of the rear-side tube part 26. The inner diameter of the front-side tube part 25 is larger than the inner diameter of the rear-side tube part 26.

The support-rib part 27 is disposed on the outer surface of the front-side tube part 25. The support-rib part 27 protrudes from the outer surface of the front-side tube part 25 radially outward of the front-side tube part 25. The support-rib part 27 has a circular-ring shape, e.g., a circular flange shape. The support-rib part 27 is a flange portion that is provided on the outer surface of the front-side tube part 25.

Referring again to FIG. 8, the filter 19 is supported by the support frame 18. The filter 19 is disposed more forward than the suction port 14 of the main-body assembly 2. The filter 19 is air permeable. The filter 19 collects foreign matter from the air that passes through the filter 19. In the embodiment, the filter 19 is made of cloth or other mesh fabric material that permits air to pass through, but blocks (collects) dust, debris, etc. The filter 19 may be, e.g., a high performance or HEPA filter.

The filter 19 has a bag shape or cup shape (bottomed hollow cylindrical shape). The filter 19 is disposed such that it covers the first lattice part 23. An opening is provided in a rear-end portion of the filter 19. The rear-end portion of the filter 19 is fixed to, for example, the front-side tube part 25. Air flows into the filter 19 from a front portion of the filter 19. Foreign matter contained in the air is collected by the filter 19. Air that has passed through the filter 19 flows out from the opening at the rear portion of the filter 19, after which it flows into the suction port 14.

The filter-fixing member 21 is disposed around the front-side tube part 25. The filter-fixing member 21 has a ring shape. The filter-fixing member 21 is press-fitted onto the front-side tube part 25. The filter-fixing member 21 is disposed such that it contacts the outer surface of the front-side tube part 25. The filter 19 is stitched to the filter-fixing member 21.

The retaining-rib member 22 is fixed to at least a portion of the support frame 18. In the embodiment, the retaining-rib member 22 is fixed to a rear-end portion of the support frame 18. More specifically, in the embodiment, the retaining-rib member 22 is fixed to a rear-end portion of the rear-side tube part 26. The retaining-rib member 22 has a circular-ring shape. At least a portion of the retaining-rib member 22 protrudes radially outward from the outer surface of the rear-side tube part 26.

The retaining-rib member 22 is an elastic body. In the embodiment, the retaining-rib member 22 is formed of a thermoplastic elastomer (TPE). The retaining-rib member 22 comprises a fixing part (attaching part, engaging part) 22A and a lip part 22B. The fixing part 22A is fixed (attached) to a rear-end portion of the rear-side tube part 26. The fixing part 22A has a ring shape. The lip part 22B is connected to the fixing part 22A. The lip part 22B has a ring shape. The lip part 22B can be elastically deformed.

Dust-Collecting Assembly

As shown in FIGS. 1-5, at least a portion of the dust-collecting assembly 4 is disposed more forward than the main-body assembly 2. The filter assembly 3 is housed in at least a portion of the dust-collecting assembly 4.

Figure 10:
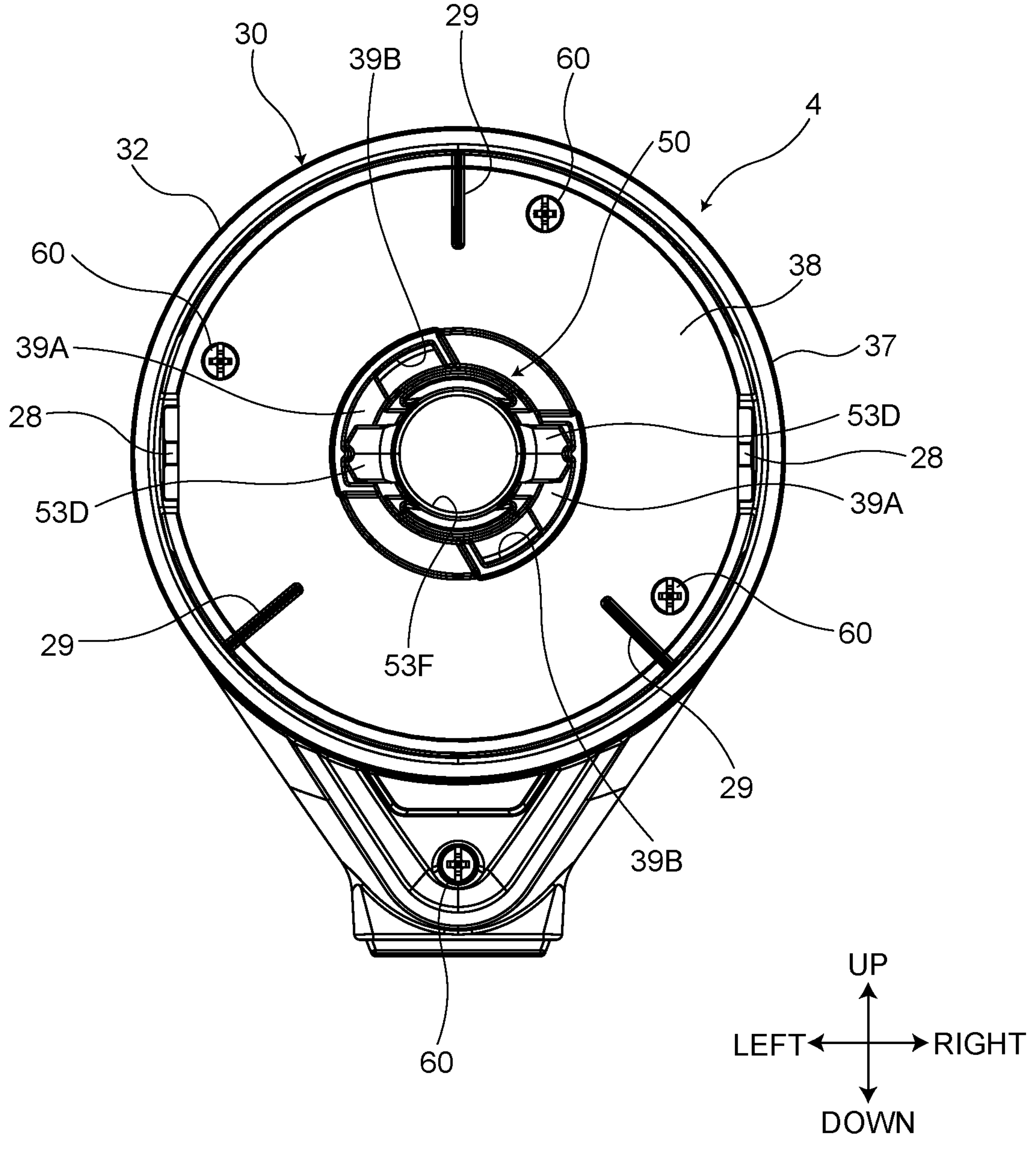
FIG. 10 is a drawing, viewed from the rear, of a dust-collecting assembly according to the embodiment.
Figure 11:
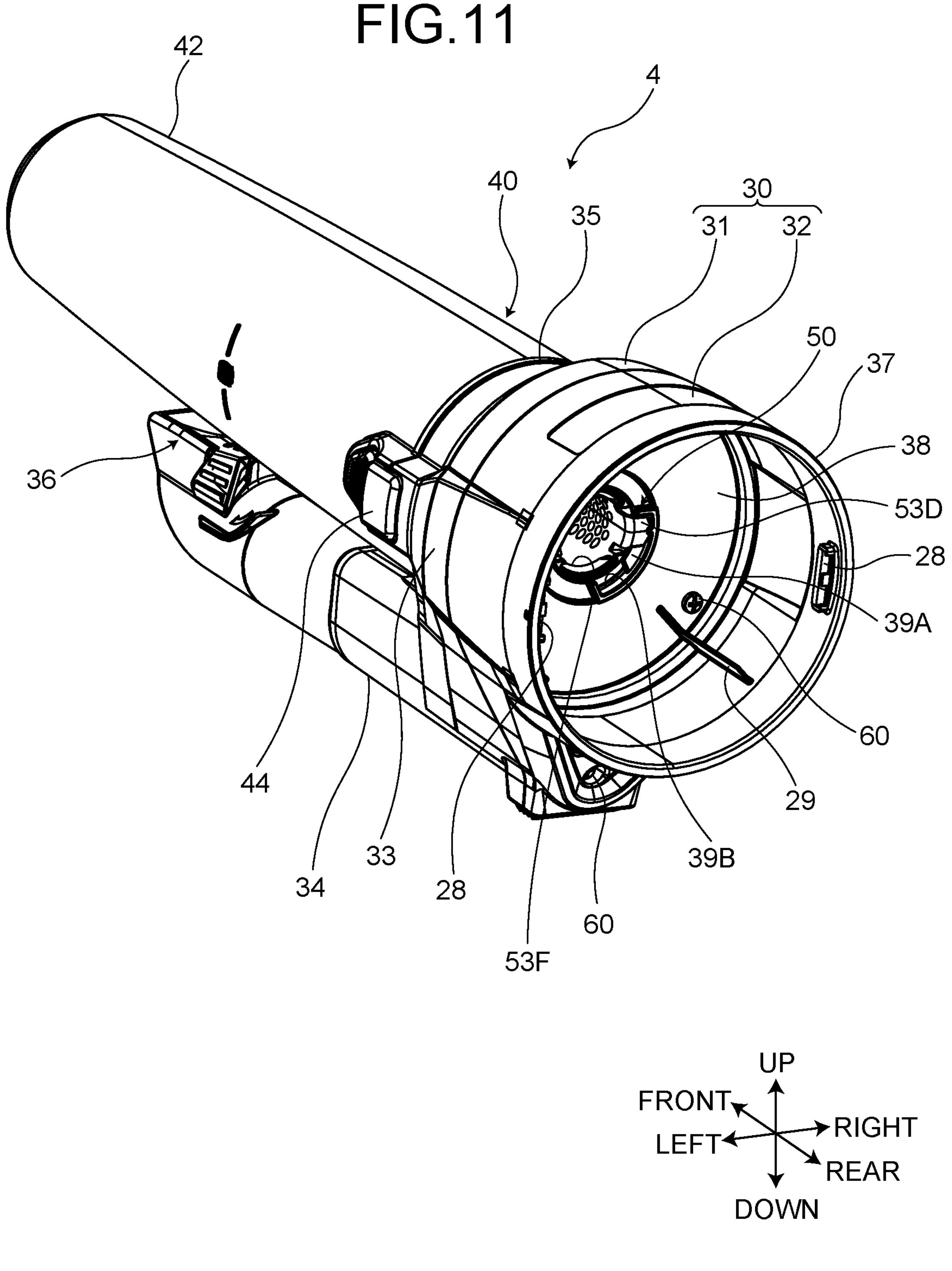
FIG. 11 is an oblique view, viewed from the rear, that shows the dust-collecting assembly according to the embodiment.
Figure 12:
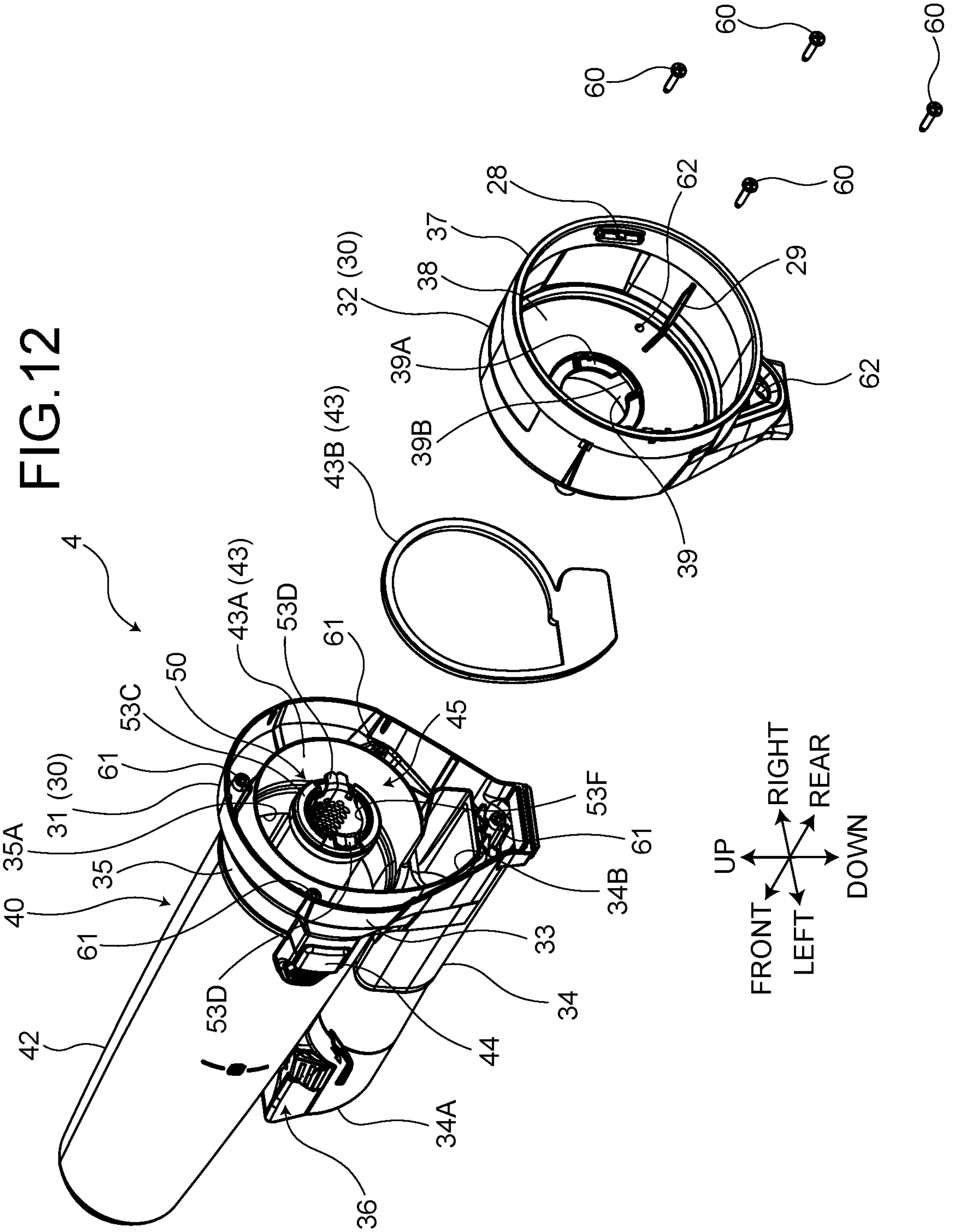
FIG. 12 is an exploded, oblique view, viewed from the rear, that shows the dust-collecting assembly according to the embodiment.

FIG. 10 is a drawing, viewed from the rear, of the dust-collecting assembly 4 according to the embodiment. FIG. 11 is an oblique view, viewed from the rear, that shows the dust-collecting assembly 4 according to the embodiment. FIG. 12 is an exploded, oblique view, viewed from the rear, that shows the dust-collecting assembly 4 according to the embodiment.

As shown in FIGS. 1-5 and 10-12, the dust-collecting assembly 4 comprises a cyclone housing 30 and a cyclonic, dust-collecting unit 40.

The cyclone housing 30 comprises a front housing 31 and a rear housing 32. At least a portion of the front housing 31 is disposed more forward than the rear housing 32. The front housing 31 and the rear housing 32 are fixed to each other by four screws 60. Screw holes 61, into which screw portions of the screws 60 are screwed, are provided in the front housing 31. Openings 62, in which intermediate portions of the screws 60 are disposed, are provided in the rear housing 32.

The front housing 31 comprises a body part 33, an inlet pipe 34, and a dust-cap-coupling-tube part 35. That is, the tube part 35 is configured to be coupled or attached to a dust cap (dust case) 42.

The rear housing 32 comprises an assembly-tube part 37, an assembly-plate part 38, a filter-unit-coupling-tube part 39, engaging-protruding parts 28, and assembly-support parts 29. That is, the tube part 39 is configured to be coupled or attached to a filter unit 50.

The cyclonic, dust-collecting unit 40 comprises swirling members (air swirling members) 43, the filter unit 50, and the dust cap (dust case) 42.

The body part 33 has a tube shape. The body part 33 is disposed at a rear portion of the front housing 31. The body part 33 is connected to the rear housing 32. The inlet pipe 34 protrudes forward from a front portion of the body part 33. The dust-cap-coupling-tube part 35 has a tube shape. The dust-cap-coupling-tube part 35 is disposed parallel to the inlet pipe 34. The dust-cap-coupling-tube part 35 protrudes forward from a front portion of the body part 33.

As shown in FIG. 1, the inlet pipe 34 is coupled to a base-end portion of the extension pipe 100. The suction nozzle 101 is coupled to a tip portion of the extension pipe 100. The suction nozzle 101 has an inlet port.

A lock mechanism 36 is provided at a front-end portion of the inlet pipe 34. The inlet pipe 34 and the extension pipe 100 are fixed to each other by the lock mechanism 36. The extension pipe 100 can be separated from the inlet pipe 34 by manually releasing the fixing (latching) by the lock mechanism 36. The extension pipe 100 is detachable from the inlet pipe 34.

The inlet pipe 34 has an inflow port (opening) 34A and an outflow port (opening) 34B. The inflow port 34A is provided in a front-end portion of the inlet pipe 34. The outflow port 34B is provided in a rear-end portion of the inlet pipe 34. A base-end portion of the extension pipe 100 is inserted into the inflow port 34A. The air suctioned in from the suction nozzle 101 flows through the extension pipe 100, after which it flows into the inflow port 34A. The air that flows through the inlet pipe 34 flows out from the outflow port 34B.

The dust-cap-coupling-tube part 35 is configured to be coupled to the dust cap 42. Lock parts 44 are provided at a rear-end portion of the dust cap 42. Recessed parts 35R (refer to FIG. 14, etc.) are provided at portions of the front housing 31. Each of the lock parts 44 comprises a hook portion, which hooks to (in) the corresponding recessed part 35R. The dust cap 42 and the dust-cap-coupling-tube part 35 are fixed to each other by the lock parts 44. The dust cap 42 is separated from the dust-cap-coupling-tube part 35 by manually releasing the fixing by the lock parts 44. The dust cap 42 is detachable from the dust-cap-coupling-tube part 35 of the front housing 31.

A front-end portion of the assembly-tube part 37 is connected to the front housing 31. The assembly-plate part 38 is connected to a front portion of the assembly-tube part 37 so as to cover the opening in the front portion of the assembly-tube part 37. The filter assembly 3 is housed in the assembly-tube part 37. The filter assembly 3 is inserted from the opening provided at the rear-end portion of the assembly-tube part 37 into the interior of the assembly-tube part 37.

The filter-unit-coupling-tube part 39 protrudes forward from a portion of the assembly-plate part 38. The filter-unit-coupling-tube part 39 has a tube shape. An opening is provided in a portion of the assembly-plate part 38. A rear-end portion of the filter-unit-coupling-tube part 39 is connected to the opening of the assembly-plate part 38.

The engaging-protruding parts 28 are inserted into the grooves 11E of the main-body housing 5. Two of the engaging-protruding parts 28 are provided at a rear-end portion of the assembly-tube part 37. The engaging-protruding parts 28 protrude radially inward from the inner surface of the assembly-tube part 37. As described above, two of the grooves 11E are likewise provided. One of the engaging-protruding parts 28 is inserted into one of the grooves 11E. The other engaging-protruding part 28 is inserted into the other groove 11E.

In the state in which the pair of engaging-protruding parts 28 of the rear housing 32 is disposed in the grooves 11E of the main-body housing 5, when the rear housing 32 and the main-body housing 5 are rotated relative to each other in one direction, the rear housing 32 and the main-body housing 5 are fixed to each other by a so-called bayonet coupling. When the rear housing 32 and the main-body housing 5 are rotated relative to each other in the other direction, the coupling between the rear housing 32 and the main-body housing 5 is released.

The assembly-support parts 29 support, from the front, the support-rib part 27 of the filter assembly 3. The support-rib part 27 makes contact with the assembly-support parts 29, which are provided on the dust-collecting assembly 4. Three of the assembly-support parts 29 are provided on the inner surface of the assembly-tube part 37 in a spaced-apart manner, preferably equispaced. The assembly-support parts 29 are composed of ribs that protrude radially inward from the inner surface of the assembly-tube part 37. In the state in which the pair of engaging-protruding parts 28 of the rear housing 32 is disposed in the grooves 11E of the main-body housing 5, the assembly-support parts 29 are disposed forward of the support-rib part 27. In the state in which the pair of engaging-protruding parts 28 of the rear housing 32 is disposed in the grooves 11E of the main-body housing 5, a rear-end portion of each of the assembly-support parts 29 opposes a front surface of the support-rib part 27.

The swirling members 43 swirl the air supplied from the inlet pipe 34. The swirling members 43 comprise a first swirling member (first air swirling member) 43A, which is provided in the front housing 31, and a second swirling member (second air swirling member) 43B, which is connected to a rear-end portion of the first swirling member 43A. A swirling passageway 45 is formed in the interior of the swirling members 43.

The dust-cap-coupling-tube part 35 has an inflow port (opening) 35A. The inflow port 35A of the dust-cap-coupling-tube part 35 functions as an inflow port of the cyclonic, dust-collecting unit 40. The inflow port 35A is provided in a rear-end portion of the dust-cap-coupling-tube part 35. The outflow port 34B of the inlet pipe 34 and the inflow port 35A of the cyclonic, dust-collecting unit 40 are fluidly connected to each other via the swirling passageway 45. The swirling passageway 45 is provided in a portion of the cyclone housing 30. The air that flows out from the outflow port 34B of the inlet pipe 34 flows through the swirling passageway 45, after which it flows into the inflow port 35A of the cyclonic, dust-collecting unit 40.

The swirling passageway 45 connects the outflow port 34B of the inlet pipe 34 and the inflow port 35A of the cyclonic, dust-collecting unit 40. The swirling passageway 45 is defined by the swirling members 43. The first swirling member 43A is disposed in the interior of the body part 33. The second swirling member 43B has a plate shape and is connected to a rear-end portion of the first swirling member 43A. The second swirling member 43B opposes at least the outflow port 34B of the inlet pipe 34. A rear-end portion of the first swirling member 43A of the front housing 31 is covered by the assembly-plate part 38 of the rear housing 32 by fixing the front housing 31 and the rear housing 32 to each other using the screws 60. In the embodiment, the swirling passageway 45 is defined by the first swirling member 43A, the second swirling member 43B, and the assembly-plate part 38. The swirling passageway 45 is an internal passageway of the cyclone housing 30.

Connection Structure

Figure 13:
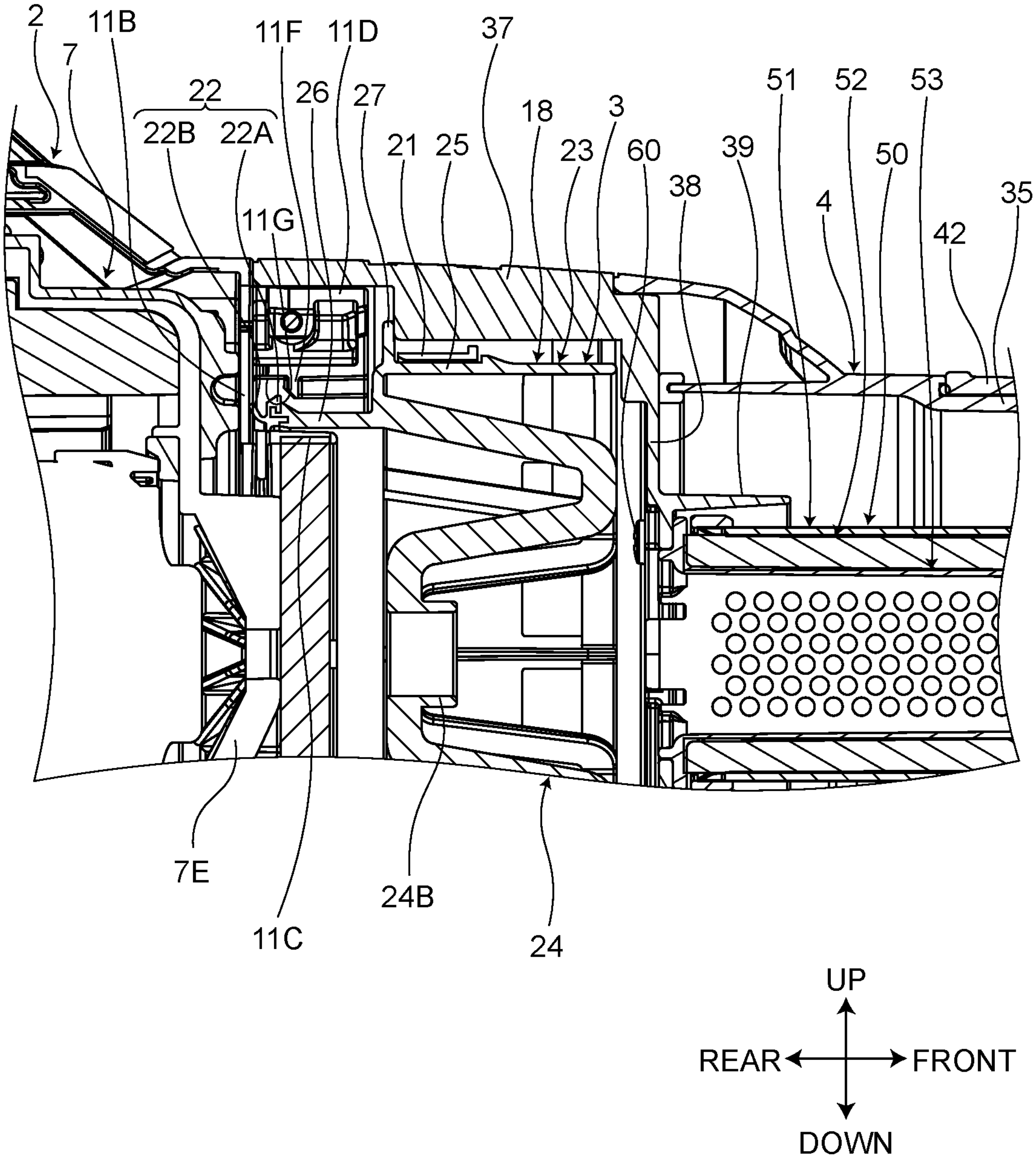
FIG. 13 is a cross-sectional view that shows the connection structure of the main-body assembly, the filter assembly, and the dust-collecting assembly according to the embodiment.

FIG. 13 is a cross-sectional view that shows the connection structure of the main-body assembly 2, the filter assembly 3, and the dust-collecting assembly 4 according to the embodiment.

Before the main-body assembly 2 and the dust-collecting assembly 4 are connected, the filter assembly 3 is mounted on the main-body assembly 2. After the filter assembly 3 has been mounted on the main-body assembly 2, the main-body assembly 2 and the dust-collecting assembly 4 are connected to each other via the filter assembly 3. The filter assembly 3 is sandwiched between the main-body assembly 2 and the dust-collecting assembly 4.

Figure 31:
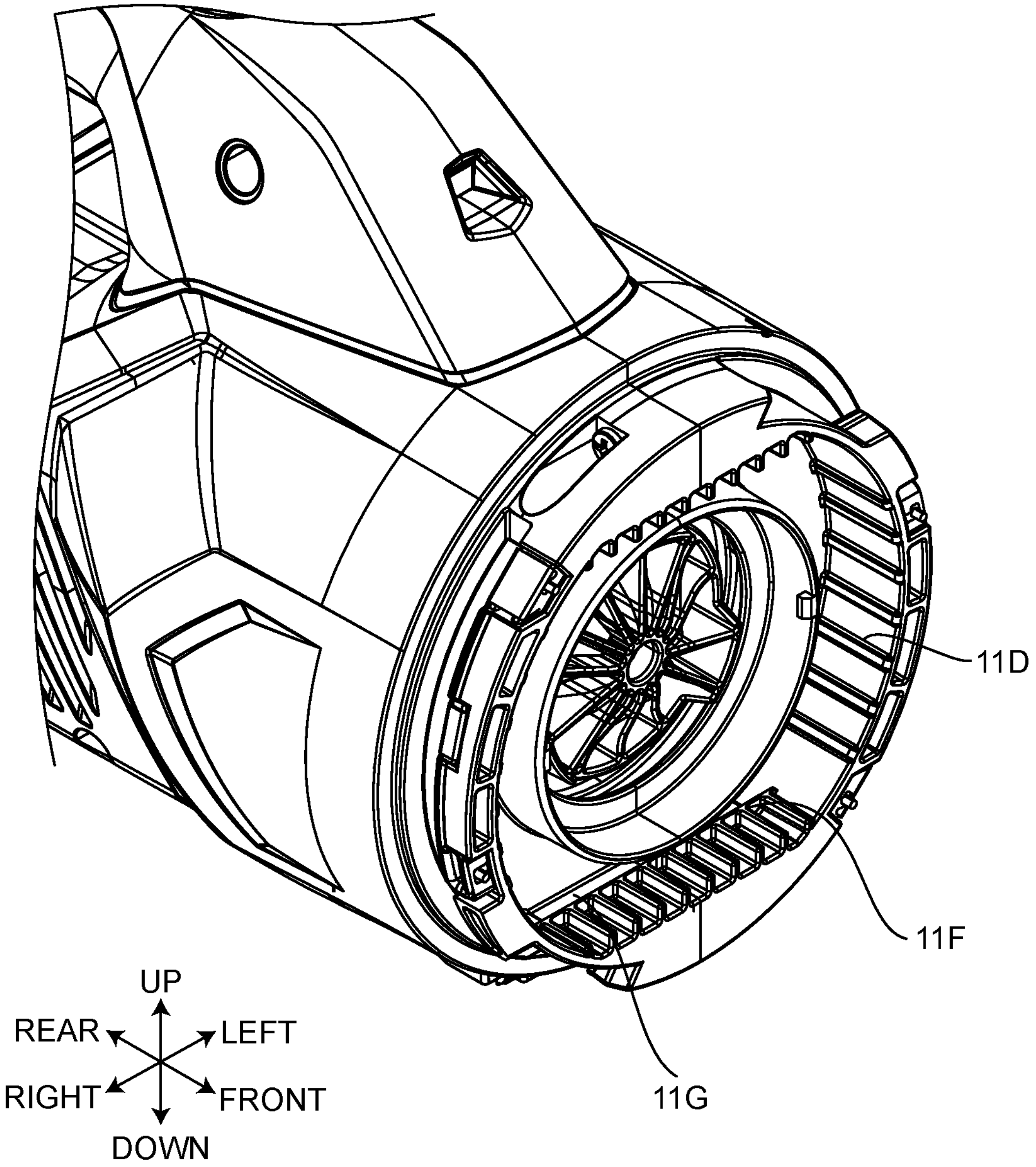
FIG. 31 is an oblique perspective view that shows the connection structure of the main-body assembly.
Figure 32:
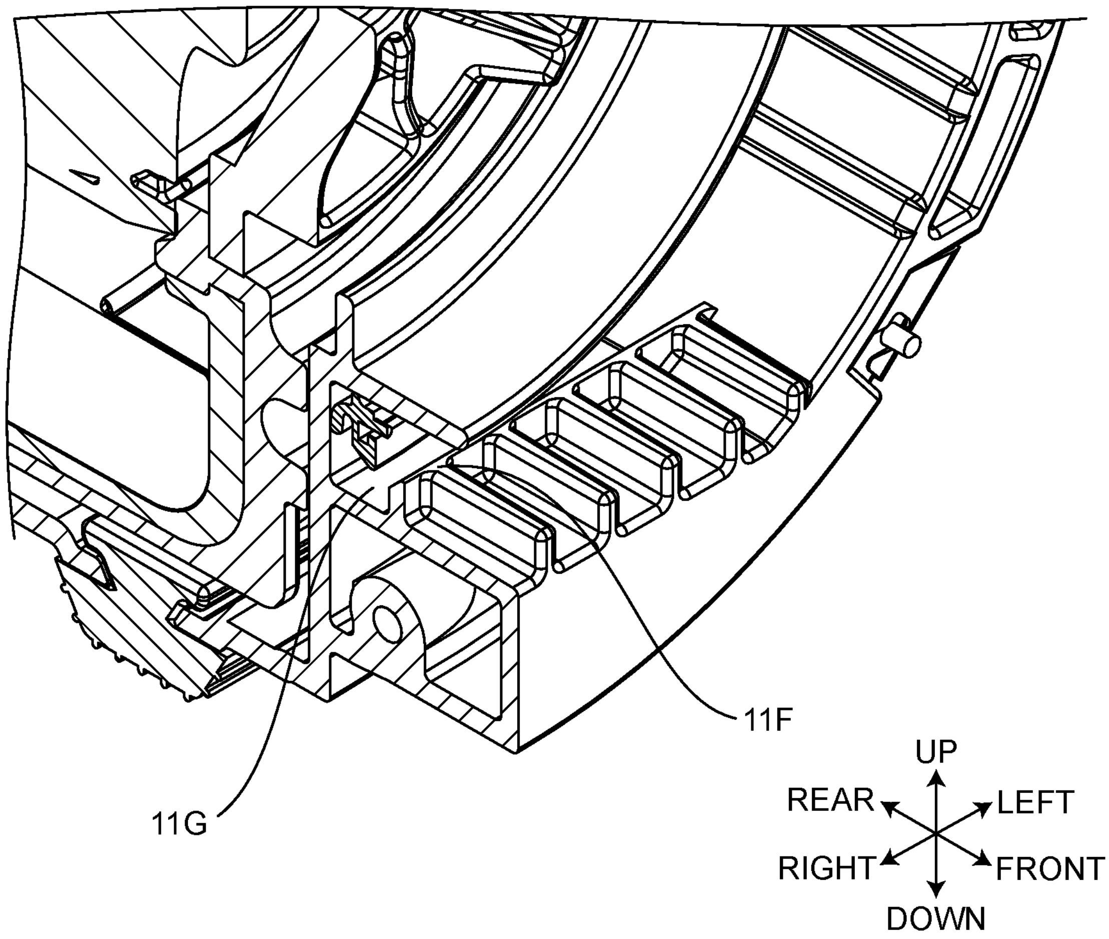
FIG. 32 is an enlarged view of a portion of the view in FIG. 31.

As shown in FIGS. 13 and 31-32, protruding parts 11F are provided on the inner surface of the outer-tube part 11D and face (extend) radially inward (perpendicularly from the inner surface of the outer-tube part 11D). The protruding parts 11F protrude radially inward from the inner surface of the outer-tube part 11D, e.g., in the form of a ridge or wall. The protruding parts 11F are provided at two locations: an upper portion (see FIG. 13) and a lower portion (see FIGS. 31-32) of the outer-tube part 11D. Grooves 11G are respectively formed (defined) by rear surfaces of the protruding parts 11F, a front surface of the front-plate part 11B, and the inner surface of the outer-tube part 11D. The grooves 11G are formed at two locations: an upper portion and a lower portion of the outer-tube part 11D. The grooves 11G are each curved (arc shaped) and have a longest dimension that extends in the circumferential direction of the main-body assembly 2 and a width dimension that extends in the front-rear direction of the main-body assembly 2. The grooves 11G preferably extend along an arc that is between about 60-75° of the main-assembly 2 in the view shown in FIG. 6, more preferably between 65-70°.

When the filter assembly 3 is to be mounted on the main-body assembly 2, the retaining-rib member 22, which is fixed to the rear-end portion of the rear-side tube part 26, is inserted between the inner-tube part 11C and the outer-tube part 11D (see FIG. 6).

Then, the user of the cleaner 1 pushes the filter assembly 3 in from forward of the main-body assembly 2 further into the main-body assembly 2 such that upper and lower portions of the retaining-rib member 22 of the filter assembly 3 are respectively disposed (engaged) in the upper and lower grooves 11G provided on (in) the main-body assembly 2, as can be seen in FIG. 13. The retaining-rib member 22 is inserted, from the front, into the grooves 11G.

As was mentioned above, the retaining-rib member 22 is an elastic body. Therefore, when the retaining-rib member 22 passes by (over) the protruding parts 11F, it elastically deforms and then enters the interiors of the grooves 11G. When the retaining-rib member 22 is disposed (engaged) in the grooves 11G, the main-body assembly 2 and the filter assembly 3 are connected to each other.

After the main-body assembly 2 and the filter assembly 3 have been connected to each other and the engaging-protruding parts 28 of the rear housing 32 are disposed in the grooves 11E of the main-body housing 5, the user of the cleaner 1 rotates the rear housing 32 and the main-body housing 5 relative to each other in the one rotational direction. Thereby, the main-body assembly 2 and the dust-collecting assembly 4 are connected to each other via the filter assembly 3.

As described above, each of the grooves 11E has a helical shape. In the state in which the engaging-protruding parts 28 of the rear housing 32 have been disposed in the grooves 11E of the main-body housing 5, when the rear housing 32 and the main-body housing 5 are rotated relative to each other in the one rotational direction, the dust-collecting assembly 4 moves rearward such that it approaches the main-body assembly 2.

Each of the assembly-support parts 29 is disposed at a location at which it opposes a front surface of the support-rib part 27 of the filter assembly 3. When the dust-collecting assembly 4 moves rearward such that it approaches the main-body assembly 2 (as a result of the relative rotation of the rear housing 32 and the main-body housing 5, the assembly-support parts 29 move rearward so as to approach the support-rib part 27, and a rear-end portion of each of the assembly-support parts 29 contacts a front surface of the support-rib part 27. When the assembly-support parts 29 move rearward while being in contact with the support-rib part 27, the filter assembly 3 moves rearward. When the filter assembly 3 moves rearward, the retaining-rib member 22, which is disposed at a rear-end portion of the filter assembly 3, is pushed against a front surface of the front-plate part 11B of the main-body assembly 2. The filter assembly 3 is interposed between the main-body assembly 2 and the dust-collecting assembly 4 in the front-rear direction. The filter assembly 3 is fixed to the main-body assembly 2 and the dust-collecting assembly 4.

Because the retaining-rib member 22 is an elastic body, it also functions as a sealing member. For example, by bringing the lip part 22B of the retaining-rib member 22 into close contact with a front surface of the front-plate part 11B, the boundary between a rear-end portion of the filter assembly 3 and the front-plate part 11B is sealed. That is, the boundary between the main-body assembly 2 and the filter assembly 3 around the suction port 14 is sealed by the retaining-rib member 22. Consequently, leakage of the air that flows into the suction port 14 is curtailed, thereby reducing pressure losses in the suction force generated by the suction unit 7.

Filter Unit

Figure 14:
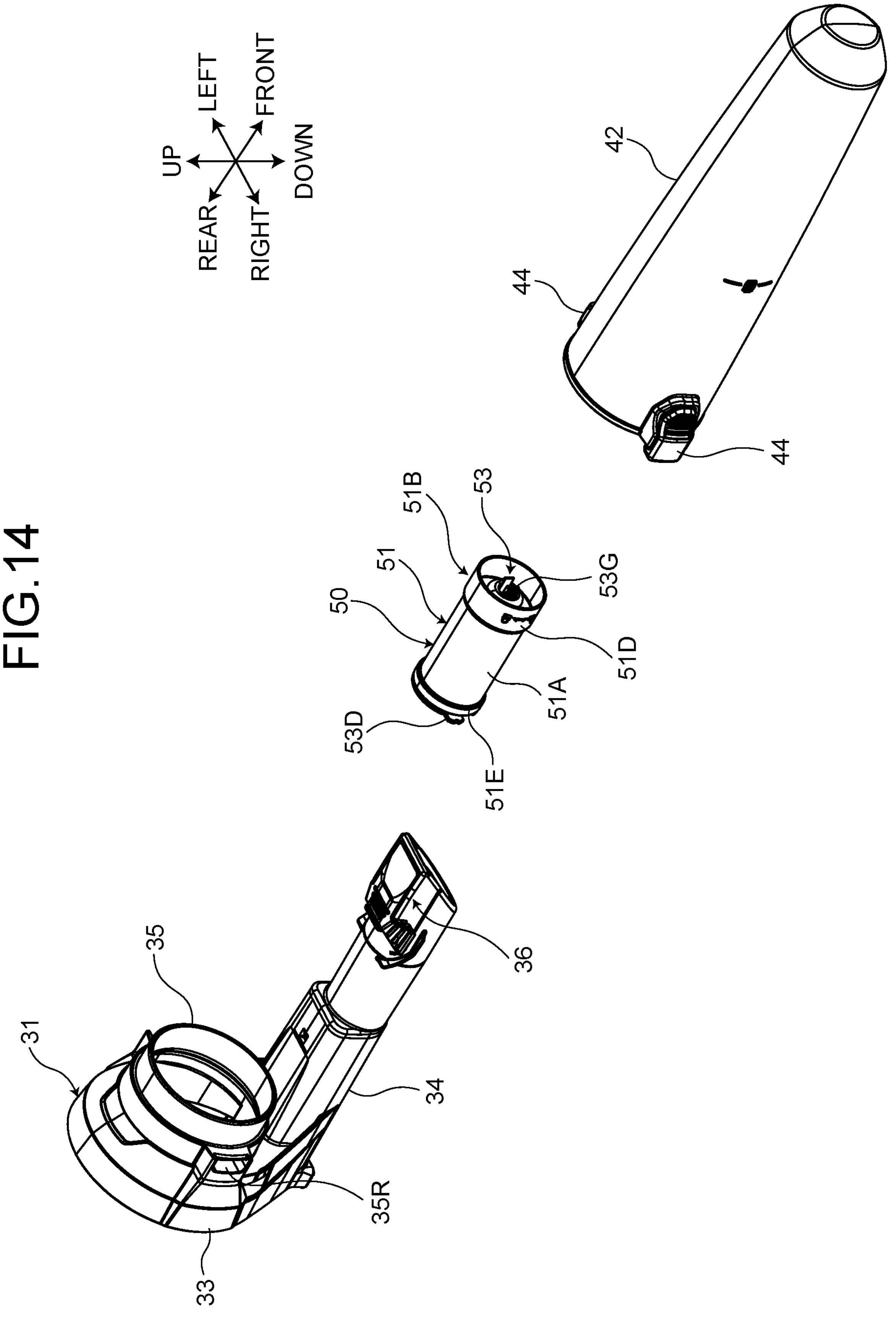
FIG. 14 is an exploded, oblique view, viewed from the front, that shows a portion of the dust-collecting assembly according to the embodiment.
Figure 15:
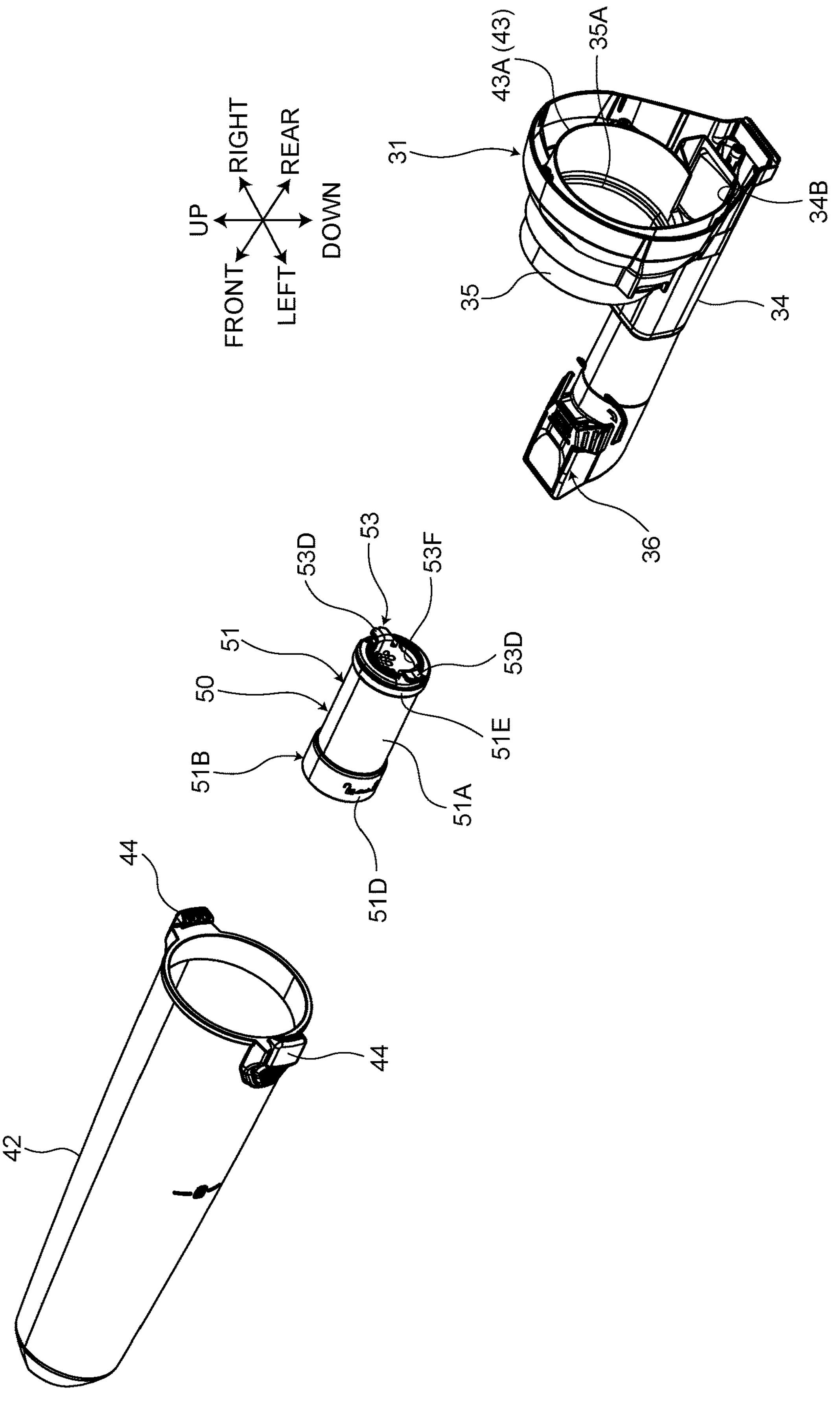
FIG. 15 is an exploded, oblique view, viewed from the rear, that shows a portion of the dust-collecting assembly according to the embodiment.

FIG. 14 is an exploded, oblique view, viewed from the front, that shows a portion of the dust-collecting assembly 4 according to the embodiment. FIG. 15 is an exploded, oblique view, viewed from the rear, that shows a portion of the dust-collecting assembly 4 according to the embodiment.

The cyclonic, dust-collecting unit 40 comprises: the swirling members 43, which swirl the air; the dust cap 42, into which the air that has passed through the swirling members 43 flows via the dust-cap-coupling-tube part 35; and the filter unit 50, through which the air that flows out from the dust cap 42 passes.

The dust cap 42 is detachable from the dust-cap-coupling-tube part 35 of the front housing 31. The dust cap 42 has an interior space, into which air flows from the inflow port 35A of the cyclonic, dust-collecting unit 40. The filter unit 50 is disposed in the interior space of the dust cap 42.

Figure 16:
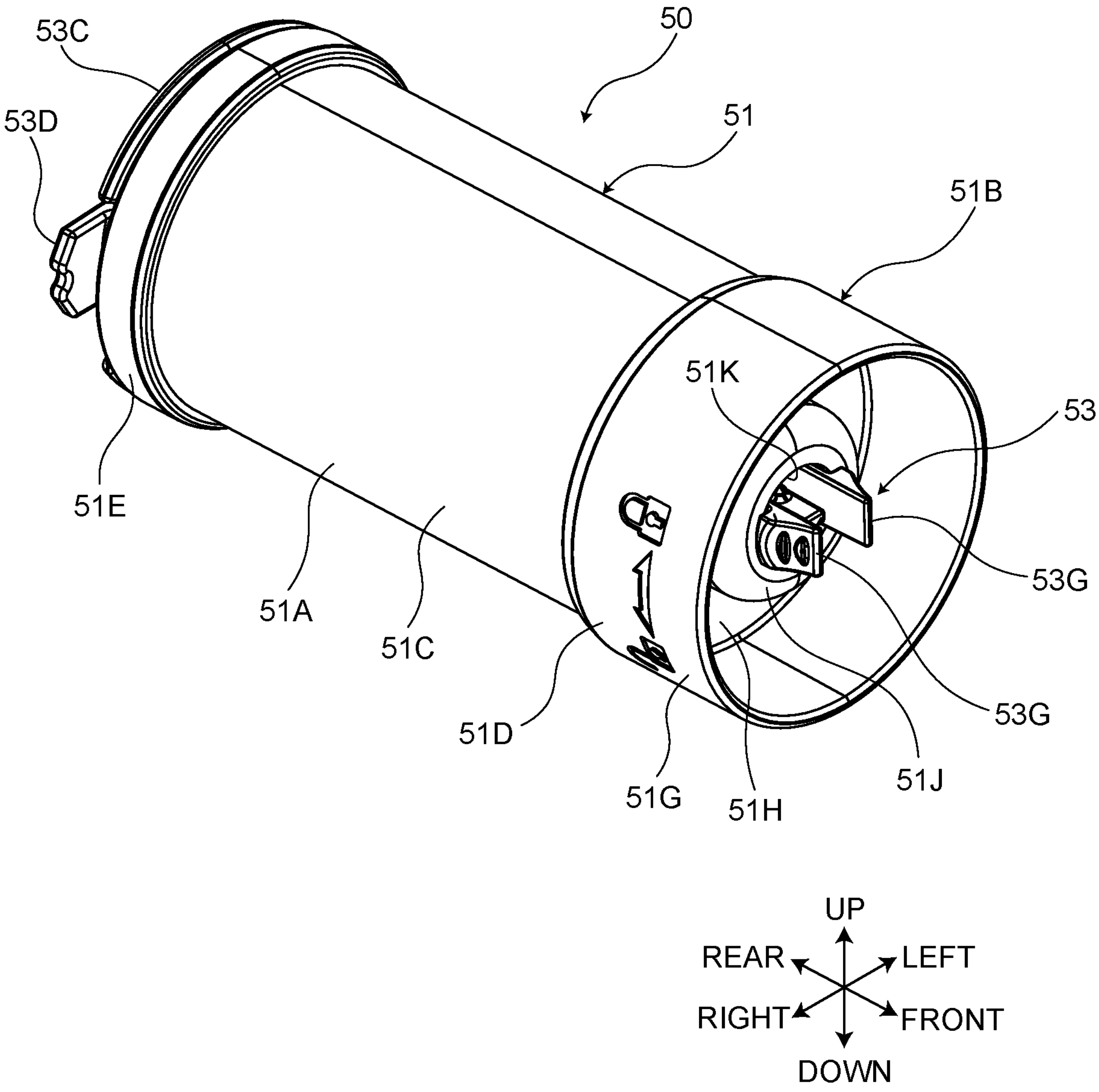
FIG. 16 is an oblique view, viewed from the front, that shows a filter unit according to the embodiment.
Figure 17:
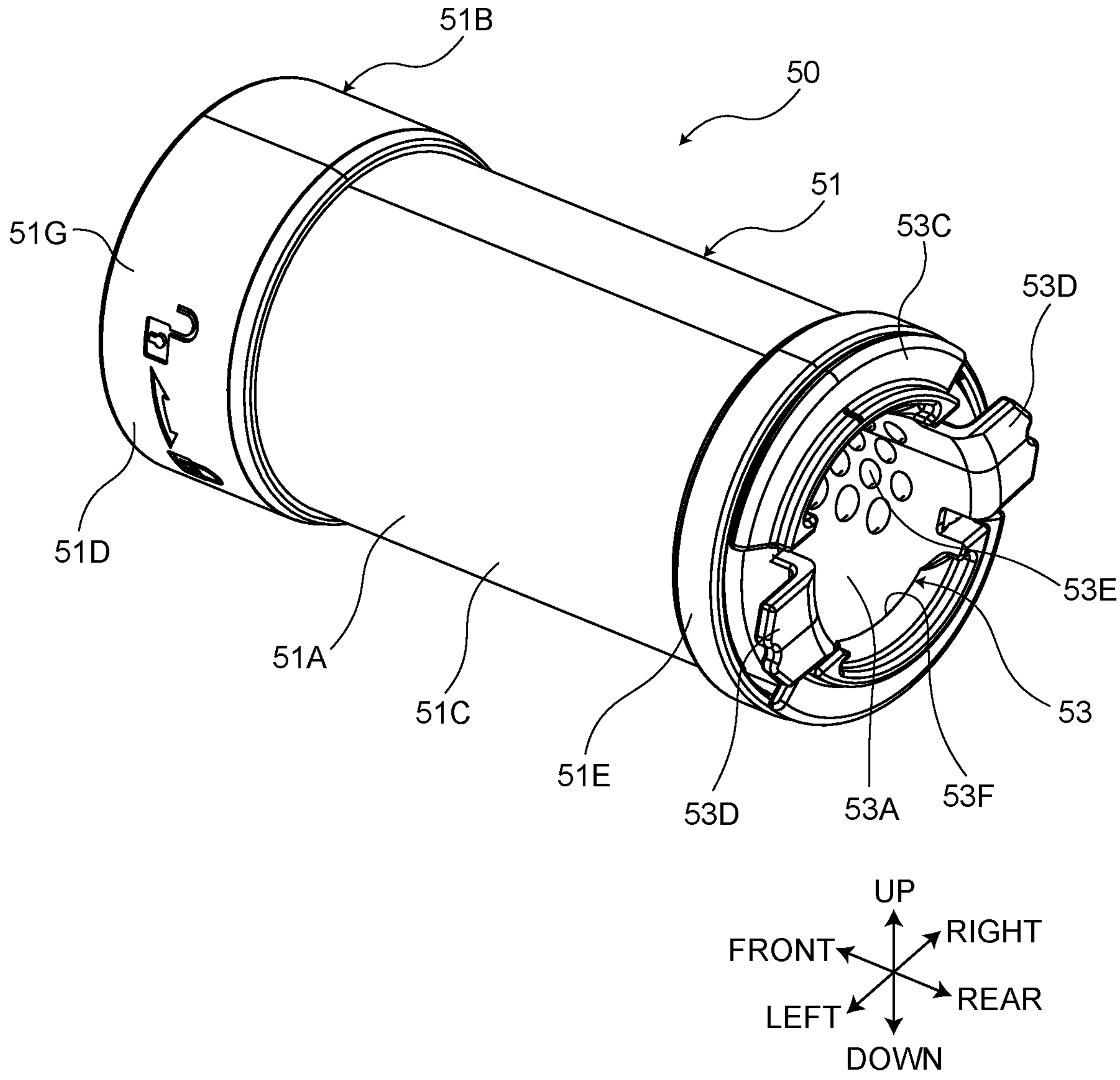
FIG. 17 is an oblique view, viewed from the rear, that shows the filter unit according to the embodiment.
Figure 18:
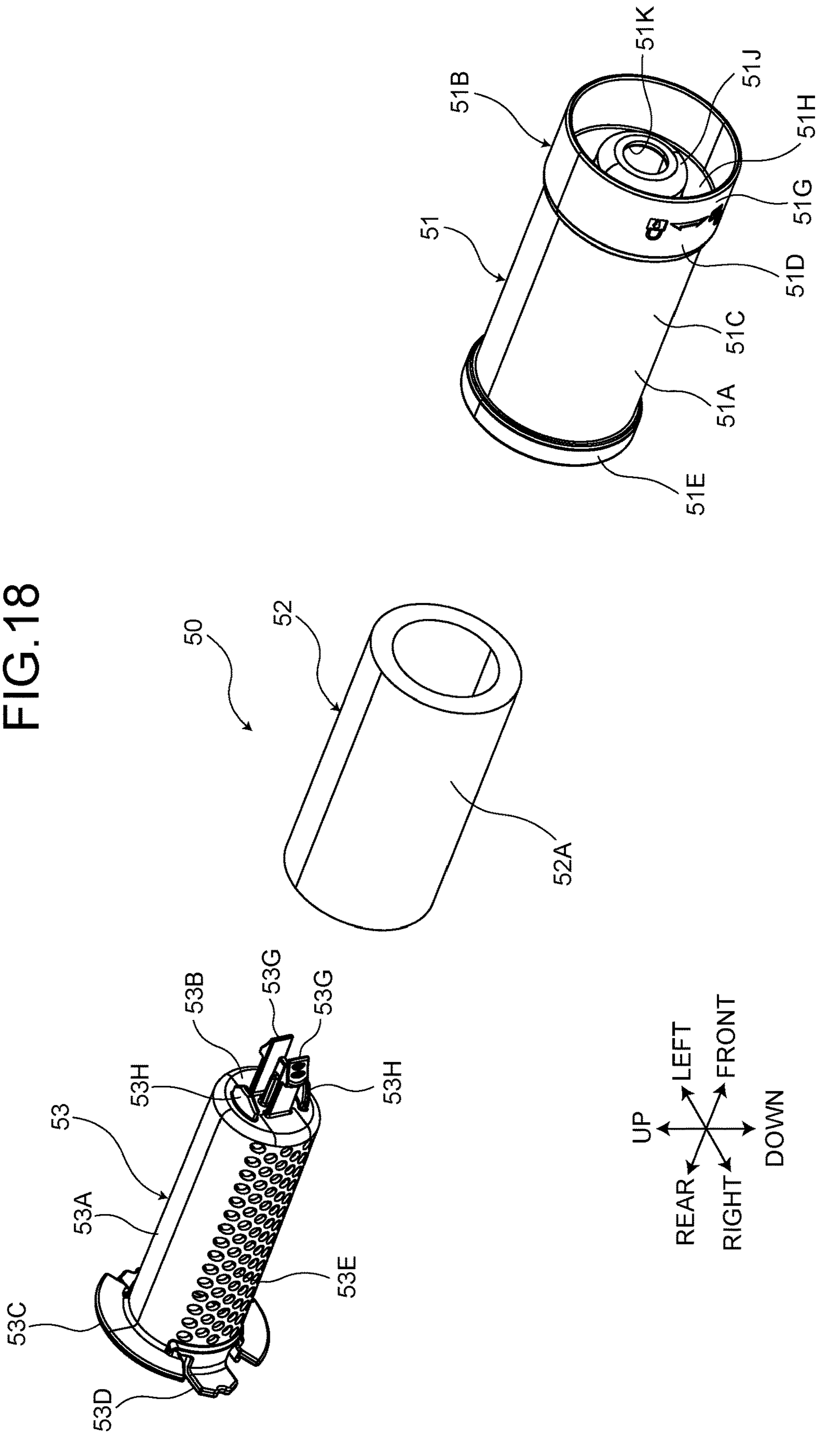
FIG. 18 is an exploded, oblique view, viewed from the front, that shows the filter unit according to the embodiment.
Figure 19:
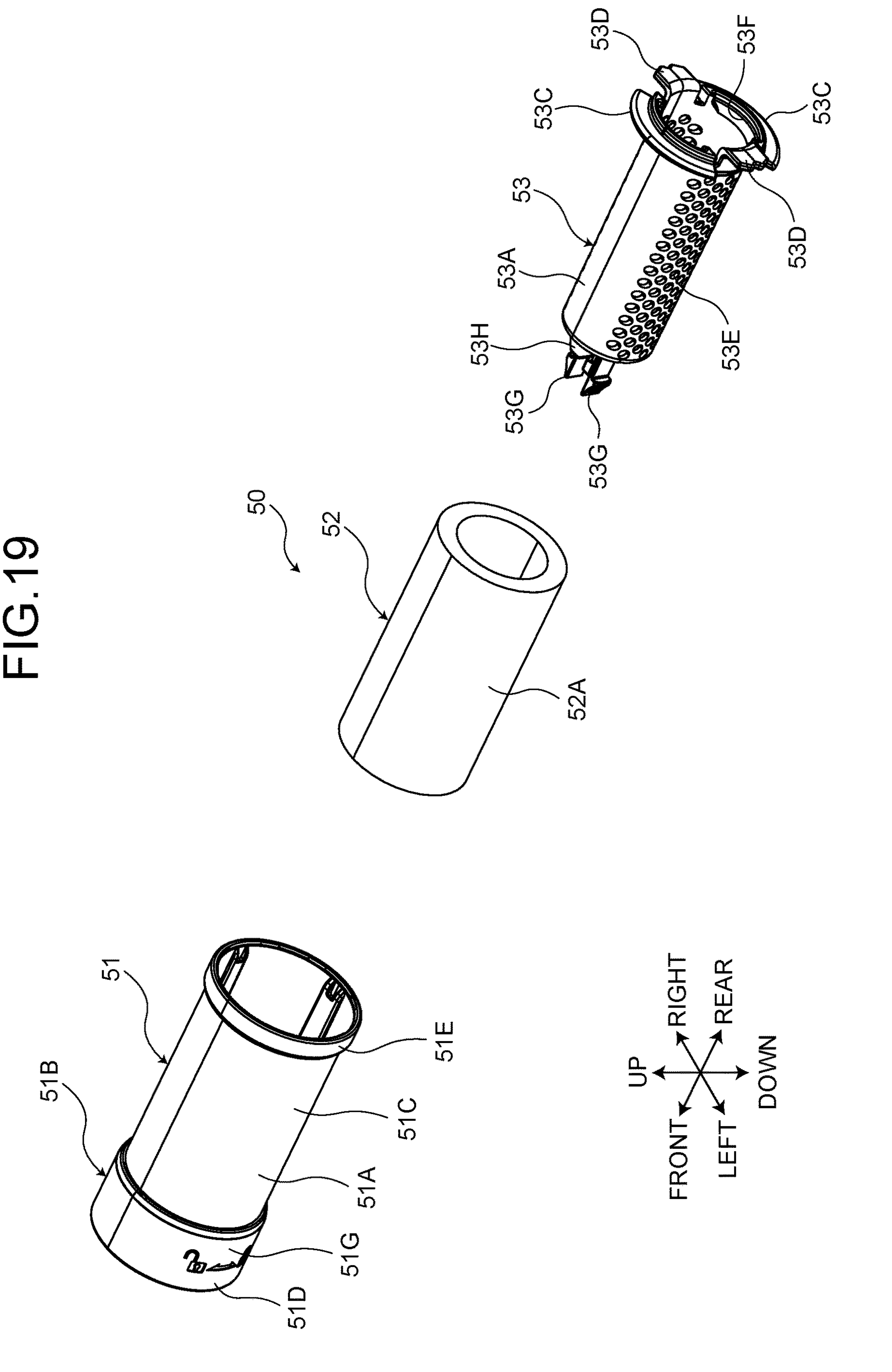
FIG. 19 is an exploded, oblique view, viewed from the rear, that shows the filter unit according to the embodiment.
Figure 20:
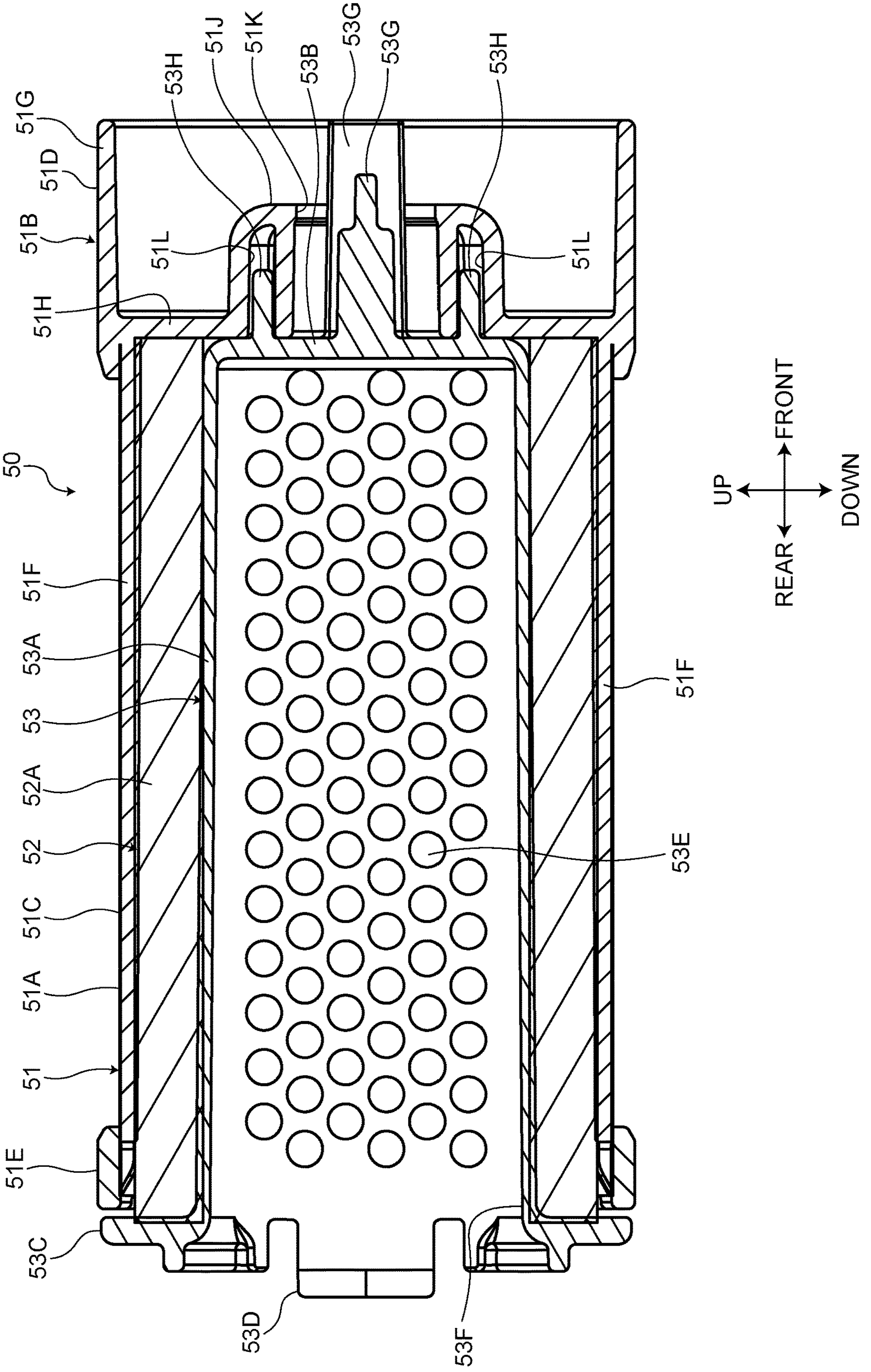
FIG. 20 is a cross-sectional view that shows the filter unit according to the embodiment.

FIG. 16 is an oblique view, viewed from the front, that shows the filter unit 50 according to the embodiment. FIG. 17 is an oblique view, viewed from the rear, that shows the filter unit 50 according to the embodiment. FIG. 18 is an exploded, oblique view, viewed from the front, that shows the filter unit 50 according to the embodiment. FIG. 19 is an exploded, oblique view, viewed from the rear, that shows the filter unit 50 according to the embodiment. FIG. 20 is a cross-sectional view that shows the filter unit 50 according to the embodiment.

The filter unit 50 comprises a prefilter (mesh filter) 51, a sound-absorbing member (tubular sponge filter) 52, and a post filter (mesh pipe) 53. The sound-absorbing member 52 is disposed around the post filter 53. At least a portion of the prefilter 51 is disposed around the sound-absorbing member 52.

Air that has flowed into the dust cap 42 via the swirling passageway 45 flows from the exterior toward the interior of the filter unit 50. Air that has passed through the prefilter 51 flows to the sound-absorbing member 52. Air that has passed through the sound-absorbing member 52 flows to the post filter 53.

The post filter 53 is made of a synthetic resin (polymer). In the embodiment, the post filter 53 is made from an acrylonitrile butadiene styrene (ABS) resin (polymer). As can be seen in FIGS. 18-20, the post filter 53 comprises a filter-tube part 53A, a filter-cover part 53B, first fixing-plate parts 53C, second fixing-plate parts 53D, holes 53E, an outflow port 53F, filter-hook parts (guide stoppers) 53G, and filter-protruding parts 53H.

The filter-cover part 53B covers an opening at one-end portion of the filter-tube part 53A in the axial direction. In the embodiment, the filter-cover part 53B covers an opening in a front-end portion of the filter-tube part 53A.

The first fixing-plate parts 53C are provided at an other-end portion (opposite end) of the filter-tube part 53A in the axial direction. In the embodiment, the first fixing-plate parts 53C are provided at a rear-end portion of the filter-tube part 53A. Two of the first fixing-plate parts 53C are provided.

The second fixing-plate parts 53D are provided at the rear-end portion of the filter-tube part 53A. The second fixing-plate parts 53D are disposed more rearward than the first fixing-plate parts 53C. The second fixing-plate parts 53D protrude radially outward of the filter-tube part 53A from the rear-end portions of the filter-tube part 53A. Two of the second fixing-plate parts 53D are provided. The amount by which the second fixing-plate parts 53D protrude in the radial direction of the filter-tube part 53A is larger than the amount by which the first fixing-plate parts 53C protrude.

The holes 53E are provided in the filter-tube part 53A. The holes 53E are formed such that they pass through the inner surface and the outer surface of the filter-tube part 53A; i.e. the holes 53E are through holes. A plurality of the holes 53E is provided in the filter-tube part 53A in a spaced-apart manner. Air passes through the holes 53E. Air around the filter unit 50 can pass through the holes 53E and flow into the interior of the filter-tube part 53A.

The outflow port 53F is provided in the rear-end portion of the filter-tube part 53A. Air that has passed through the holes 53E and flowed into the interior of the filter-tube part 53A flows out from the outflow port 53F.

The filter-hook parts 53G are provided at (on) the front-end portion of the filter-tube part 53A. The filter-hook parts 53G protrude forward from a front surface of the filter-cover part 53B. Two of the filter-hook parts 53G are provided. The filter-hook parts 53G comprise snap fits. The filter-protruding parts 53H are used for positioning with respect to the prefilter 51.

The filter-protruding parts 53H protrude forward from the front surface of the filter-cover part 53B.

The sound-absorbing member 52 is disposed around (surrounding) the filter-tube part 53A. The sound-absorbing member 52 comprises a circular-tube-shaped (hollow cylindrical) sponge member. The sponge member is made of a foamed urethane. The sponge member is a porous member having a plurality of holes (fine holes or pores) 52A, through which air passes.

At least a portion of the prefilter 51 is disposed around the sound-absorbing member 52. The prefilter 51 comprises a mesh member 51A, which has a circular-tube shape (hollow cylindrical shape), and a filter frame 51B, which supports the mesh member 51A. The mesh member 51A is disposed around (surrounding) the sound-absorbing member 52. The mesh member 51A is made of a nylon (polyamide). The mesh member 51A has a plurality of holes 51C, through which air passes.

As described above, the prefilter 51 has the holes 51C, through which air passes. The sound-absorbing member 52 has the holes 52A, through which air passes. The post filter 53 has the holes 53E, through which air passes. The size of the holes 51C of the prefilter 51 is larger than the size of the holes 52A of the sound-absorbing member 52. The size of the holes 52A of the sound-absorbing member 52 is smaller than the size of the holes 53E of the post filter 53.

As shown in FIG. 20, the outer surface of the filter-tube part 53A and the inner surface of the sound-absorbing member 52 (directly) contact each other. The outer surface of the sound-absorbing member 52 and the inner surface of the prefilter 51 (directly) contact each other.

Figure 21:
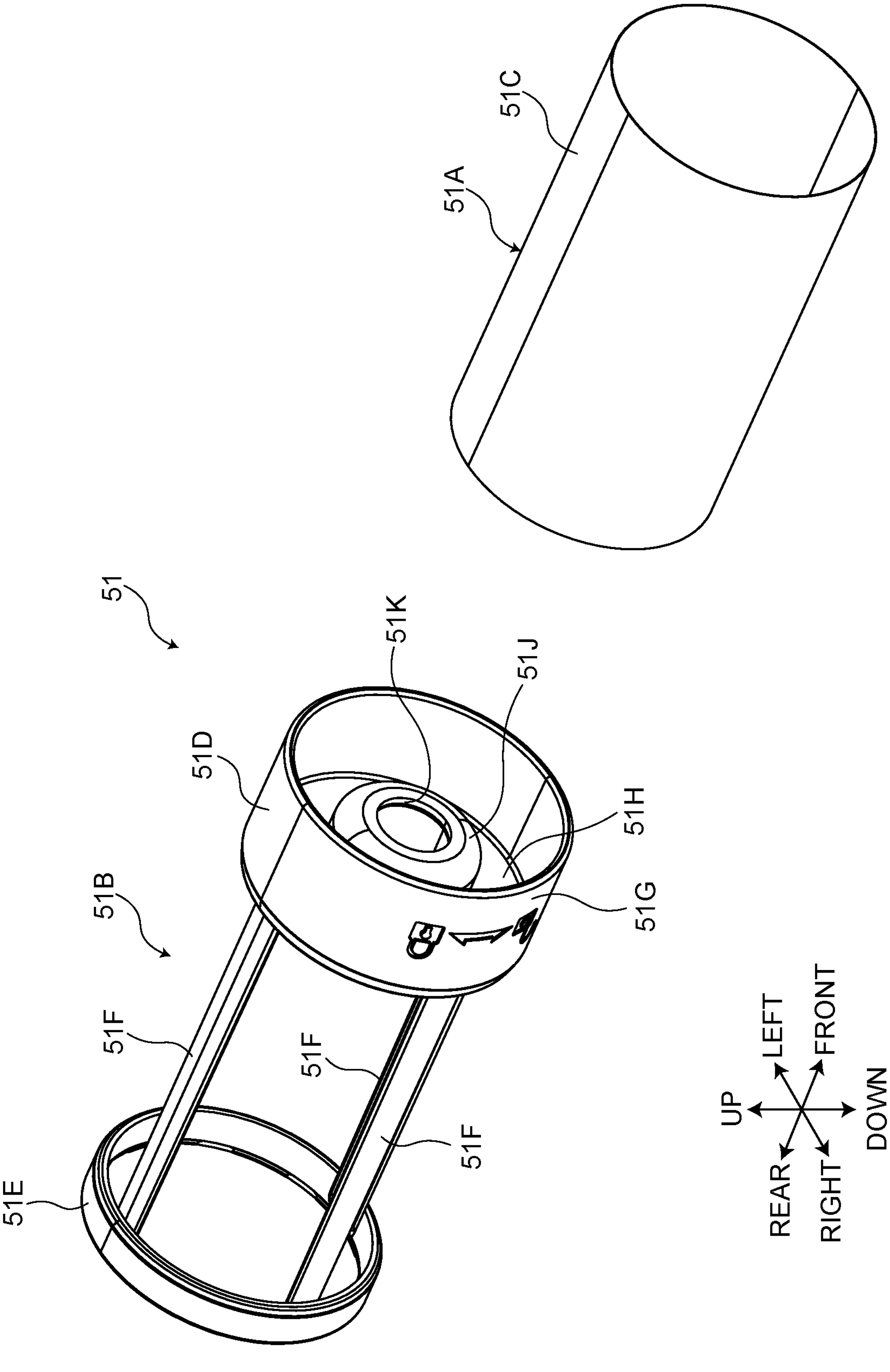
FIG. 21 is an exploded, oblique view, viewed from the front, that shows a prefilter according to the embodiment.

FIG. 21 is an exploded, oblique view, viewed from the front, that shows the prefilter 51 according to the embodiment. As shown in FIG. 21, the prefilter 51 comprises the mesh member 51A, which has a circular-tube shape, and the filter frame 51B, which supports the mesh member 51A. The mesh member 51A and the filter frame 51B are integral.

The filter frame 51B comprises: a first fixing part 51D, which is fixed to a front-end portion, i.e., one-end portion, of the mesh member 51A in the axial direction; a second fixing part 51E, which is fixed to a rear-end portion, i.e., the other-end portion (opposite end), of the mesh member 51A in the axial direction; and frame-coupling parts 51F, which connect the first fixing part 51D and the second fixing part 51E. In the embodiment, the first fixing part 51D, the second fixing part 51E, and the frame-coupling parts 51F are integral (a single member) without any seams or breaks therebetween.

The first fixing part 51D comprises: a circular-tube part (hollow circular cylindrical part) 51G, which is disposed around a front-end portion of the mesh member 51A; a circular-ring part 51H, which is disposed such that it covers an opening in a front-end portion of the mesh member 51A; and a filter-coupling part 51J, which protrudes forward from a center portion of the circular-ring part 51H. A hole 51K is provided in the filter-coupling part 51J. In the state in which the filter-hook parts 53G have been inserted into the hole 51K, the filter-hook parts 53G are hooked to the filter-coupling part 51J around the hole 51K.

As shown in FIG. 20, recessed parts (recesses) 51L, into which the filter-protruding parts 53H are inserted, are formed on (in) a rear surface of the filter-coupling part 51J.

The second fixing part 51E is a circular-tube (ring) shape that is disposed around a rear-end portion of the mesh member 51A.

The frame-coupling parts 51F are disposed such that they connect the circular-tube part 51G of the first fixing part 51D and the second fixing part 51E. Each of the frame-coupling parts 51F has a rod shape. The frame-coupling parts 51F are disposed in the interior of the mesh member 51A. The frame-coupling parts 51F support the mesh member 51A. A plurality of the frame-coupling parts 51F is provided in the circumferential direction of the mesh member 51A in a spaced-apart manner. In the embodiment, four of the frame-coupling parts 51F are provided in the circumferential direction of the mesh member 51A in a spaced-apart manner.

The prefilter 51 and the post filter 53 are positioned by inserting the filter-protruding parts 53H into the recessed parts 51L. In the state in which the filter-hook parts 53G, which function as snap fits, are inserted into the hole 51K, the prefilter 51 and the post filter 53 are fixed to each other by hooking the filter-hook parts 53G onto the filter-coupling part 51J.

The sound-absorbing member 52 is sandwiched between the inner surface of the prefilter 51 and the outer surface of the post filter 53.

The prefilter 51, the sound-absorbing member 52, and the post filter 53 are separable. The prefilter 51 and the post filter 53 are separated by detaching the filter-hook parts 53G from the filter-coupling part 51J. The prefilter 51, the sound-absorbing member 52, and the post filter 53 are separated by separating the prefilter 51 and the post filter 53. Because the prefilter 51, the sound-absorbing member 52, and the post filter 53 are separable, the user of the cleaner 1 can easily perform maintenance on each of the prefilter 51, the sound-absorbing member 52, and the post filter 53. The user of the cleaner 1 can, for example, easily clean the prefilter 51, the sound-absorbing member 52, and the post filter 53.

As can be seen in FIG. 13, a rear-end portion of the post filter 53 is inserted into the filter-unit-coupling-tube part 39.

The rear-end portion of the post filter 53 is disposed in the interior of the filter-unit-coupling-tube part 39. The filter unit 50 is detachable from the filter-unit-coupling-tube part 39. As can be seen in FIG. 12, a support part 39A, which has a ring shape, is provided in the interior of a rear-end portion of the filter-unit-coupling-tube part 39. Notches 39B, through which the second fixing-plate parts 53D can pass, are provided in portions of the support part 39A. After the second fixing-plate parts 53D have passed through the notches 39B, by rotating the filter unit 50, the first fixing-plate parts 53C oppose a front surface of the support part 39A, and the second fixing-plate parts 53D oppose a rear surface of the support part 39A. The first fixing-plate parts 53C and the second fixing-plate parts 53D sandwich the support part 39A in the front-rear direction. Thereby, the filter unit 50 and the rear housing 32 are fixed to each other. The fixing of the filter unit 50 and the rear housing 32 to each other is released by rotating the filter unit 50 such that the second fixing-plate parts 53D coincide with the notches 39B. The filter unit 50 is detachable from the rear housing 32.

The outflow port 53F of the filter unit 50 functions as an outflow port of the cyclonic, dust-collecting unit 40. Air in the interior space of the dust cap 42 flows into an internal passageway of the filter unit 50 via the holes 53E. Air that has passed through the internal passageway of the filter unit 50 flows out from the outflow port 53F of the cyclonic, dust-collecting unit 40.

There is a possibility that noise will be generated by air, which has flowed into the dust cap 42 via the swirling passageway 45, passing through the holes 53E of the post filter 53. For example, when air that swirls in the interior of the dust cap 42 makes direct contact with the surface of the filter-tube part 53A, which has the holes 53E, there is a possibility that noise will be generated. In the embodiment, the sound-absorbing member 52 is disposed such that it covers the filter-tube part 53A. Direct contact of the air that swirls in the interior of the dust cap 42 with the surface of the filter-tube part 53A, which has the holes 53E, is curtailed by the sound-absorbing member 52. Thereby, the generation of noise is curtailed.

As described above, the sound-absorbing member 52 is a sponge member. Consequently, there is a possibility that foreign matter in the interior of the dust cap 42 will adhere to the surface of the sound-absorbing member 52. In the embodiment, the prefilter 51 is disposed such that it covers the sound-absorbing member 52. Adherence of foreign matter to the sound-absorbing member 52 is curtailed (reduced) by the prefilter 51. The prefilter 51 comprises the mesh member 51A. Consequently, adherence of foreign matter to the prefilter 51 is curtailed.

Lock Mechanism

Figure 22:
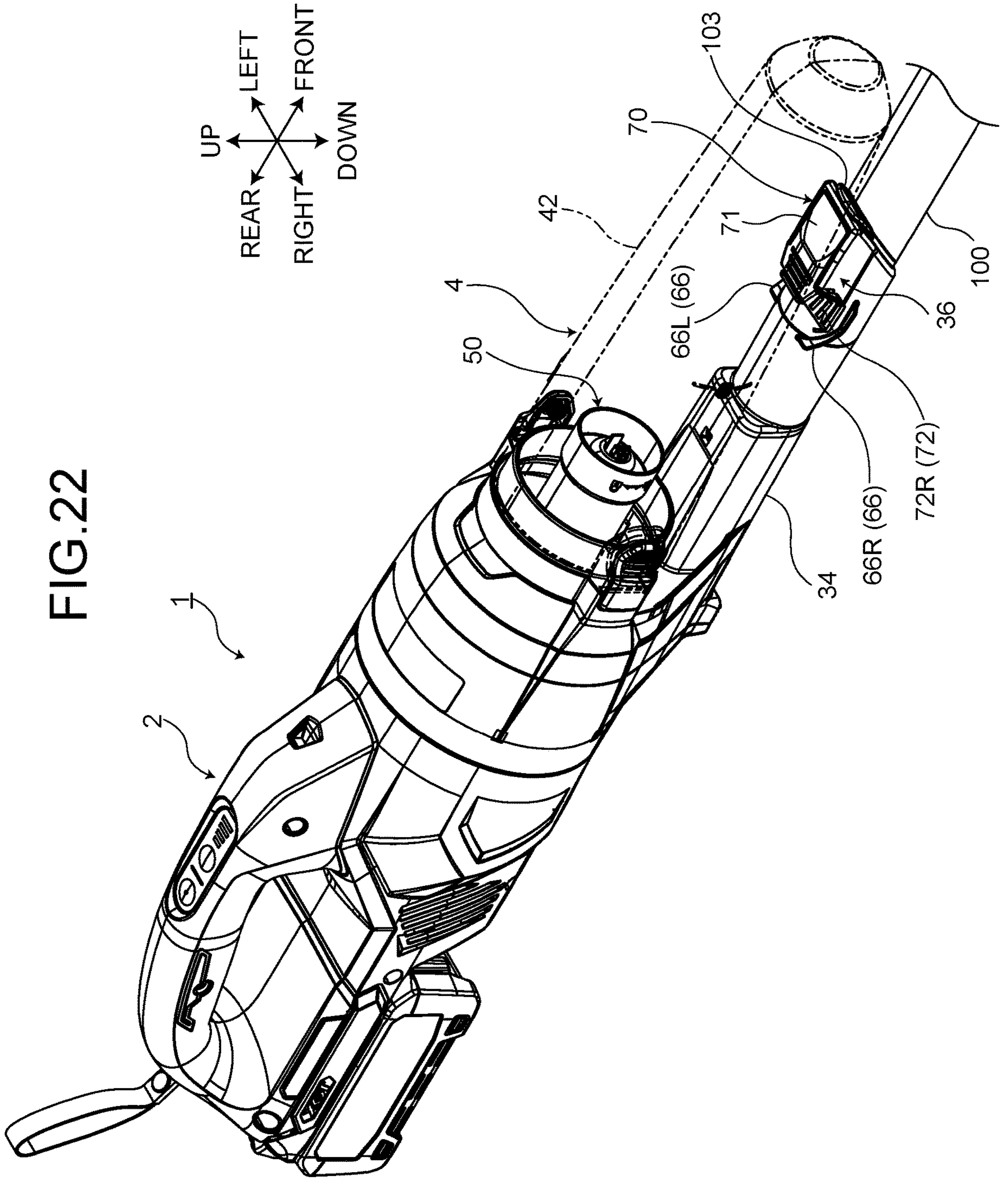
FIG. 22 is an oblique view, viewed from the front, that shows the cleaner according to the embodiment.
Figure 23:
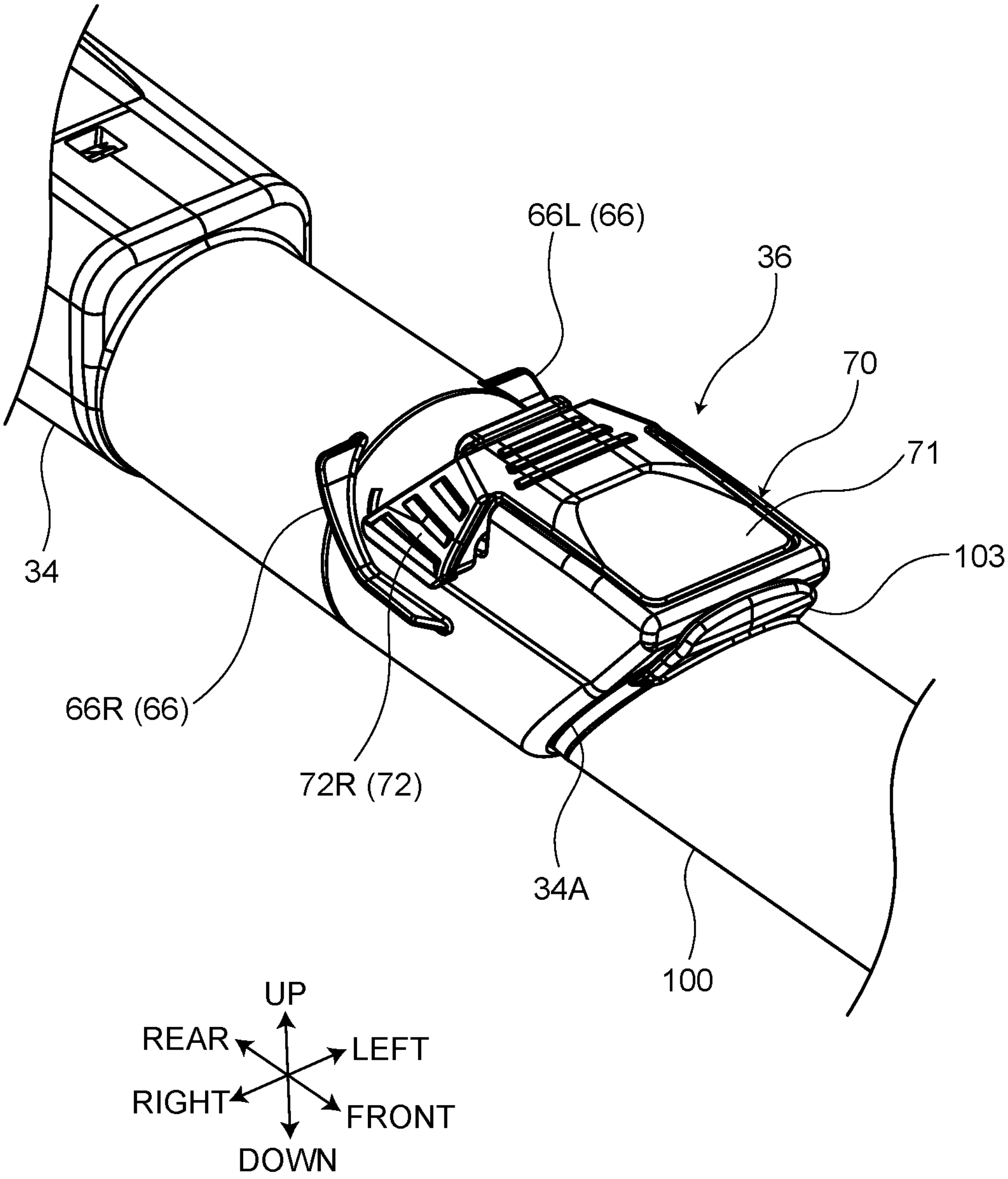
FIG. 23 is an oblique view, viewed from the front, that shows a lock mechanism according to the embodiment.
Figure 24:
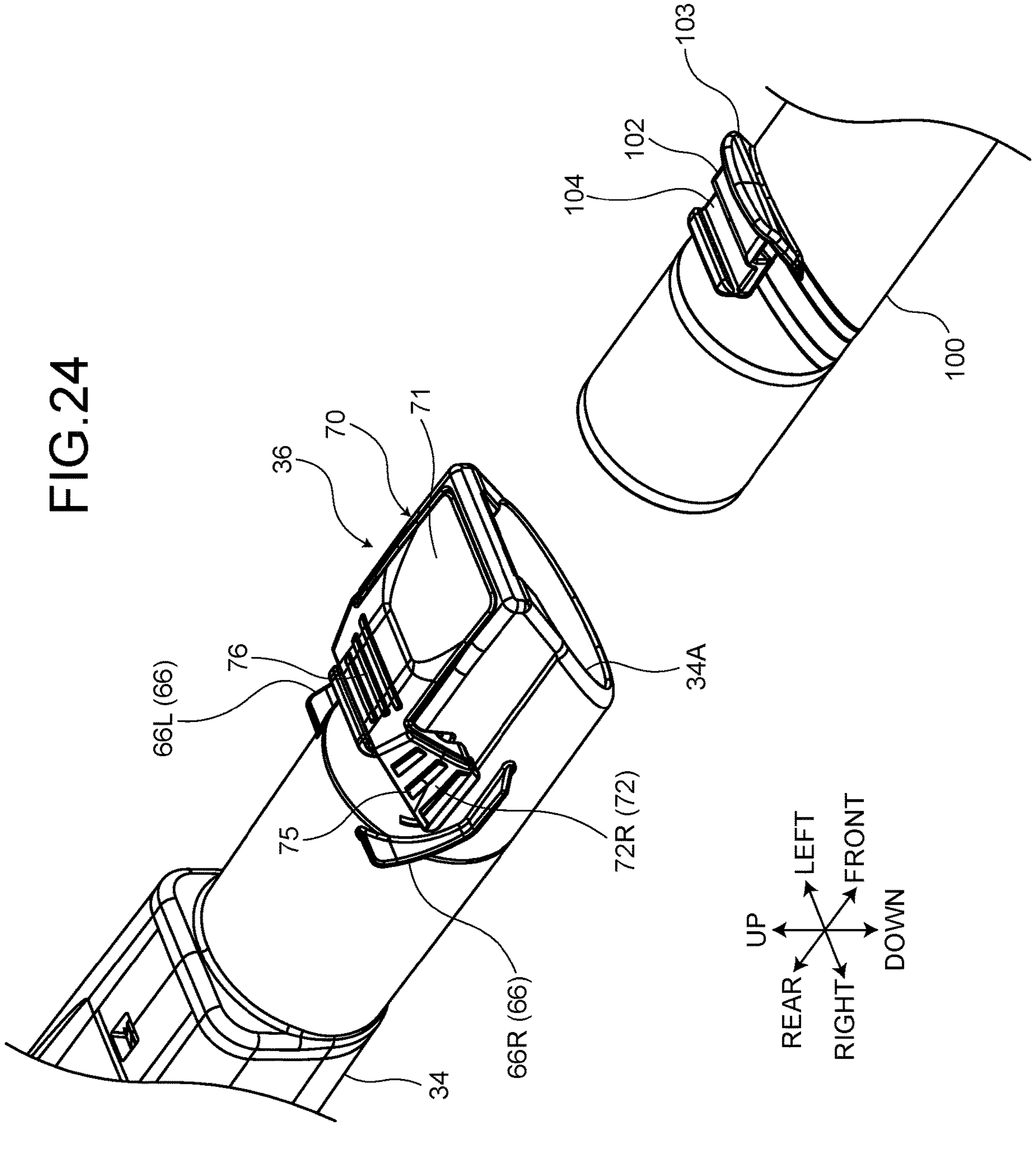
FIG. 24 is an oblique view, viewed from the front, that shows an inlet pipe and the extension pipe according to the embodiment.
Figure 25:
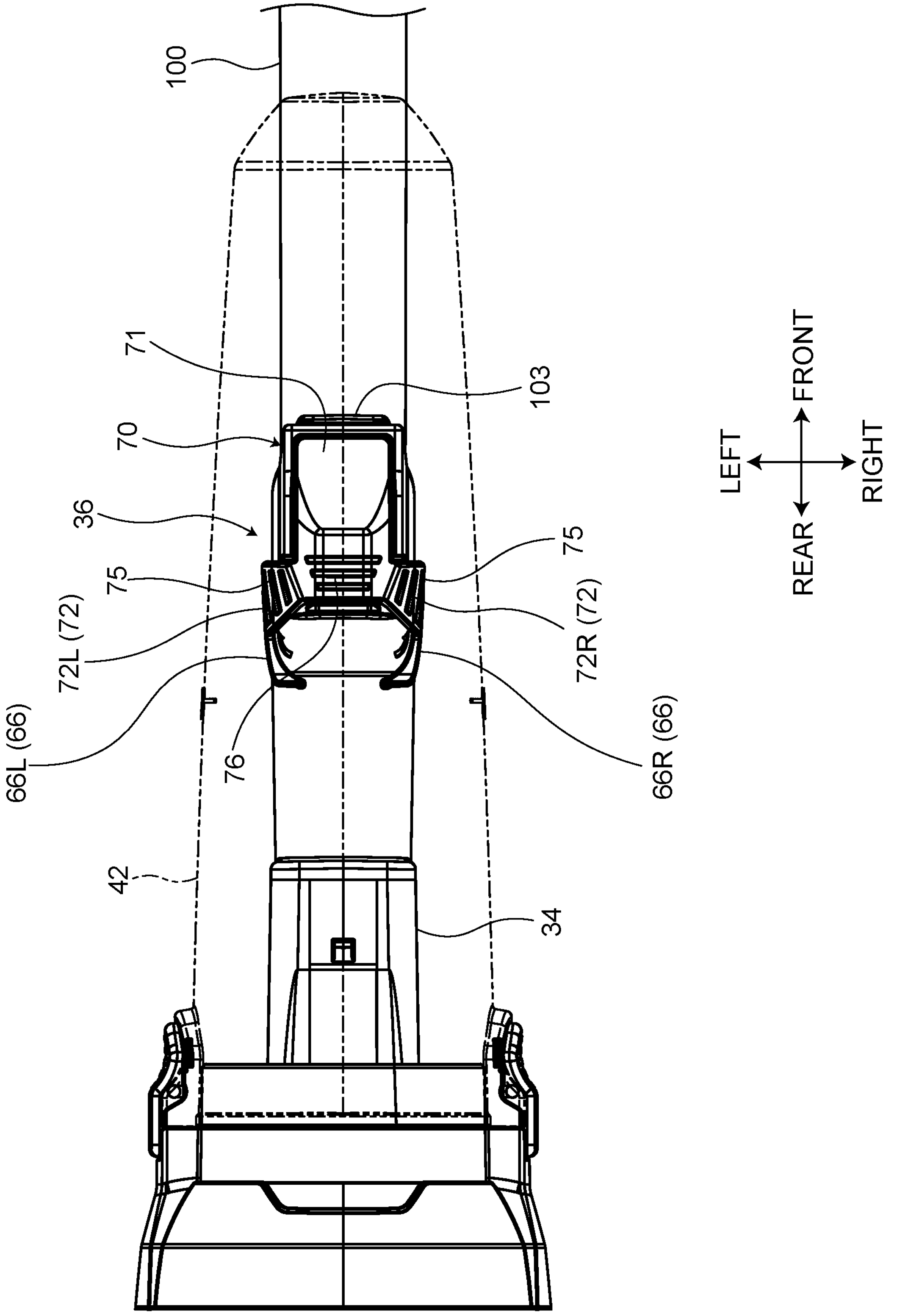
FIG. 25 is a drawing, viewed from above, of the lock mechanism according to the embodiment.
Figure 26:
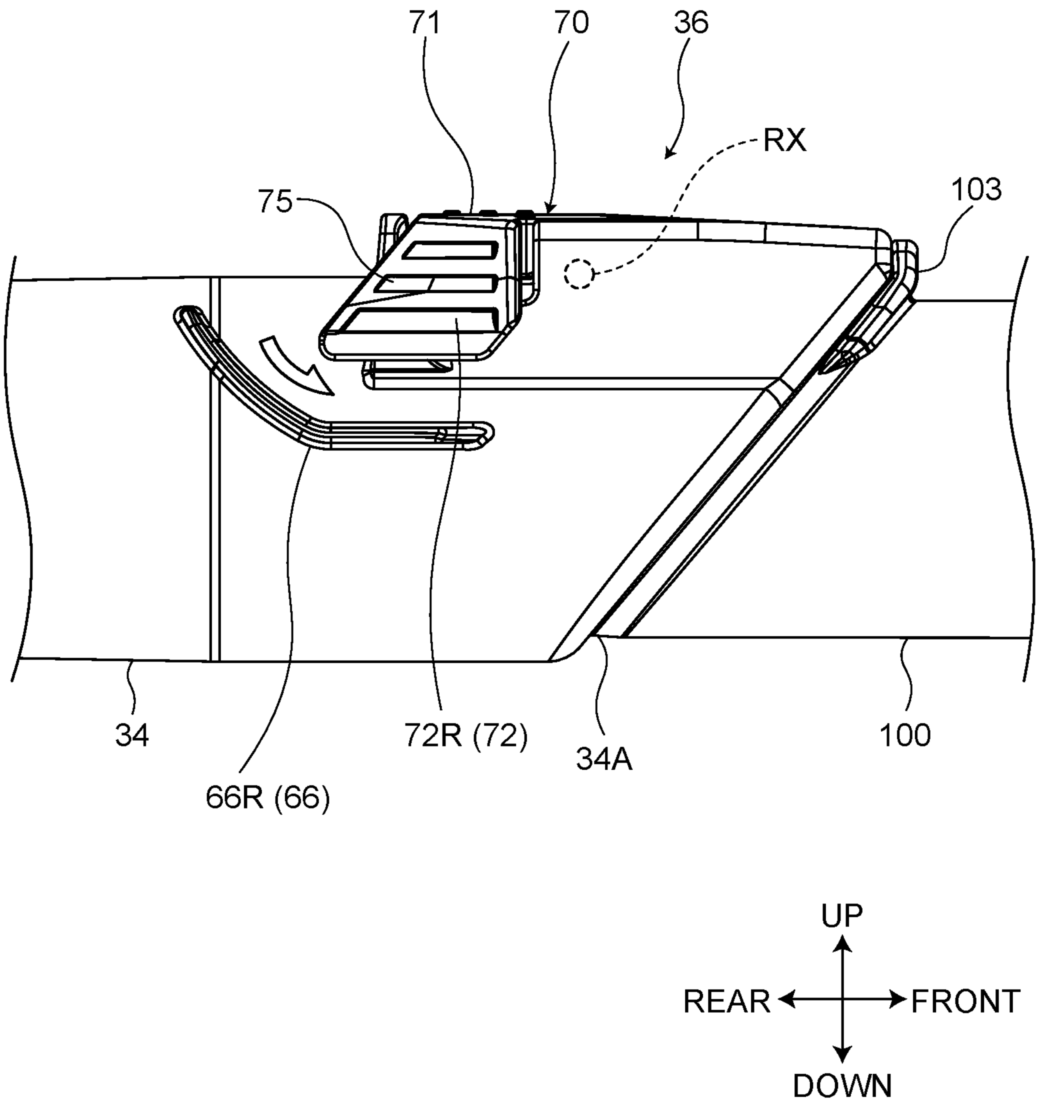
FIG. 26 is a side view that shows the lock mechanism according to the embodiment.
Figure 27:
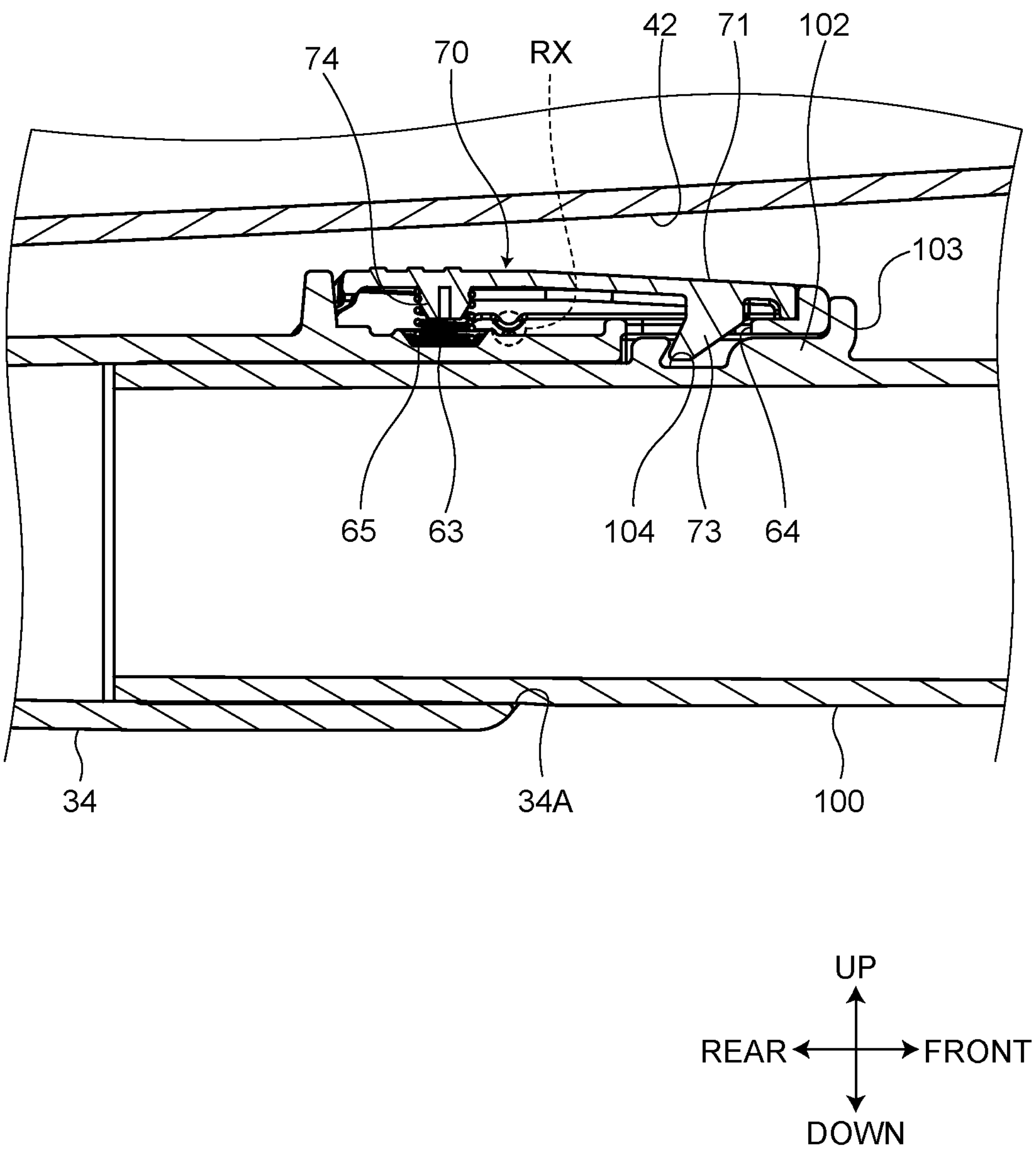
FIG. 27 is a cross-sectional view that shows the lock mechanism according to the embodiment.

FIG. 22 is an oblique view, viewed from the front, that shows the cleaner 1 according to the embodiment. FIG. 23 is an oblique view, viewed from the front, that shows the lock mechanism 36 according to the embodiment. FIG. 24 is an oblique view, viewed from the front, that shows the inlet pipe 34 and the extension pipe 100 according to the embodiment. FIG. 25 is a drawing, viewed from above, of the lock mechanism 36 according to the embodiment. FIG. 26 is a side view that shows the lock mechanism 36 according to the embodiment. FIG. 27 is a cross-sectional view that shows the lock mechanism 36 according to the embodiment.

The cleaner 1 comprises the lock mechanism 36, which fixes the extension pipe 100 that has been connected to the inlet pipe 34. The lock mechanism 36 fixes the inlet pipe 34 and the extension pipe 100, which has been inserted into the inflow port 34A of the inlet pipe 34. At least a portion of the lock mechanism 36 is provided on the inlet pipe 34. The lock mechanism 36 comprises a pipe-lock lever 70 and a coil spring 63.

As shown in FIG. 22, the pipe-lock lever 70 is disposed downward of the dust cap 42. As shown in FIG. 25, in the left-right direction, the dimension of the dust cap 42 is larger than the dimension of the pipe-lock lever 70.

The pipe-lock lever 70 comprises a main-body part 71, projection parts 72, and a pipe-hook part 73. The main-body part 71 and the projection parts 72 are disposed outward of the inlet pipe 34. The main-body part 71 and the projection parts 72 oppose the outer surface of the inlet pipe 34.

The main-body part 71 is disposed on an upper portion of the inlet pipe 34. The outer shape (contour) of the main-body part 71 has a quadrangular shape that is elongated in the front-rear direction. The pipe-hook part 73 is disposed on the main-body part 71. The pipe-hook part 73 is provided at a front-end portion of a lower surface of the main-body part 71. The pipe-hook part 73 is provided such that it protrudes downward from the lower surface of the main-body part 71.

The projection parts 72 project laterally from side portions of the main-body part 71. In the embodiment, the projection parts 72 project laterally from a rear portion of side portions of the main-body part 71. The outer shape of the projection parts 72 is triangular shaped. Surfaces of the projection parts 72 are tilted downward as they go laterally and rearward.

In the embodiment, the projection parts 72 comprise a left-projection part 72L, which projects leftward from a left portion of the main-body part 71, and a right-projection part 72R, which projects rightward from a right portion of the main-body part 71. The left-projection part 72L projects leftward from a rear portion of a left portion of the main-body part 71. The right-projection part 72R projects rightward from a rear portion of a right portion of the main-body part 71. A surface of the left-projection part 72L is tilted downward as it goes leftward and rearward. A surface of the right-projection part 72R is tilted downward as it goes rightward and rearward.

A pipe through hole 64 is provided in a portion of the inlet pipe 34. The pipe through hole 64 is formed such that it passes through the outer surface and the inner surface of the inlet pipe 34. The pipe-hook part 73 protrudes downward from a lower surface of the main-body part 71. The pipe-hook part 73 can move more inward than the outer surface of the inlet pipe 34 via the pipe through hole 64. The pipe-hook part 73 can enter the interior of the inlet pipe 34.

The extension pipe 100 comprises a protruding part (protrusion, ridge) 103 and an engaging part (shoulder, raised portion) 102, which is supported on (extends from) the protruding part 103. The protruding part 103 protrudes upward from an upper surface of the extension pipe 100. A front-end portion of the engaging part 102 is connected to the protruding part 103. The engaging part 102 can elastically deform in the state in which the engaging part 102 is supported on the protruding part 103. A rear-end portion of the engaging part 102 will move in the up-down direction in response to elastic deformation of the engaging part 102. A pipe-recess part (recess, groove) 104 is provided on (in) an upper surface of the engaging part 102.

The pipe-hook part (hook) 73 of the pipe-lock lever 70 is hooked to (in) the pipe-recess part 104, which is provided on the extension pipe 100. By hooking the pipe-hook part 73 to (in) the pipe-recess part 104, the inlet pipe 34 and the extension pipe 100 are fixed to each other. In the state in which the pipe-hook part 73 has been hooked to the pipe-recess part 104, the protruding part 103 opposes a front-end portion of the inlet pipe 34.

The pipe-lock lever 70 is supported on the inlet pipe 34 so as to be pivotable about pivot axis RX. Pivot axis RX extends in the left-right direction. As shown in FIG. 26 and FIG. 27, pivot axis RX of the pipe-lock lever 70 is disposed more rearward than the pipe-hook part 73. The projection parts 72 are disposed more rearward than pivot axis RX of the pipe-lock lever 70.

The coil spring 63 is disposed between a lower surface of the main-body part 71 and an upper surface of the inlet pipe 34. The coil spring 63 generates an elastic force such that a front-end portion of the main-body part 71 moves downward. A support-protruding part 74 is provided on a lower surface of the main-body part 71. The pipe-lock lever 70 and the coil spring 63 are positioned by inserting the support-protruding part 74 into the coil spring 63. A support-recessed part (recess) 65 is formed on (in) the outer surface of the inlet pipe 34. The inlet pipe 34 and the coil spring 63 are positioned by disposing the lower-end portion of the coil spring 63 in the support-recessed part 65.

By manipulating the projection parts 72, the user of the cleaner 1 can release the fixing of the extension pipe 100 by the lock mechanism 36. More specifically, to release the fixing (attachment, latching), the user manipulates the pipe-lock lever 70 to move the projection parts 72 downward. By moving the projection parts 72 downward, the pipe-lock lever 70 pivots about pivot axis RX such that a front-end portion of the main-body part 71 moves upward. By moving the front-end portion of the main-body part 71 upward, the pipe-hook part 73 is removed from the pipe-recess part 104. The fixing of the inlet pipe 34 and the extension pipe 100 is released by removing the pipe-hook part 73 from the pipe-recess part 104.

Owing to the elastic force of the coil spring 63, the pipe-lock lever 70 pivots about pivot axis RX such that a front-end portion of the main-body part 71 moves downward. In the state in which the extension pipe 100 is inserted in the inflow port 34A of the inlet pipe 34, the pipe-hook part 73 is inserted into the pipe-recess part 104 by moving the front-end portion of the main-body part 71 downward. The inlet pipe 34 and the extension pipe 100 are fixed to each other by inserting the pipe-hook part 73 into the pipe-recess part 104.

In the embodiment, the pipe-lock lever 70 comprises anti-slip ribs 75, which are provided on surfaces of the projection parts 72. The anti-slip ribs 75 comprise a plurality of protruding parts protruding from surfaces of the projection parts 72. Owing to the anti-slip ribs 75, even if the surfaces of the projection parts 72 are tilted, the user can smoothly manipulate the projection parts 72.

In the embodiment, the dust cap 42 is disposed directly above the pipe-lock lever 70. Even if it is difficult to manipulate the main-body part 71 owing to the dust cap 42, the user of the cleaner 1 can pivot the pipe-lock lever 70 by manipulating the projection parts 72, and thereby can release the fixing of the inlet pipe 34 and the extension pipe 100.

It is noted that the user may manipulate the main-body part 71 such that the main-body part 71 moves downward. Anti-slip ribs 76 are provided at a rear portion of a surface of the main-body part 71. The user can smoothly manipulate the main-body part 71 by using the anti-slip ribs 76.

The dust-collecting assembly 4 comprises lever guards 66, which protrude laterally from side portions of the inlet pipe 34. The lever guards 66 protect the pipe-lock lever 70. The lever guards 66 protect at least the projection parts 72. The lever guards 66 are disposed at least partly around the projection parts 72. In the embodiment, at least portions of the lever guards 66 are disposed more downward than the projection parts 72. At least portions of the lever guards 66 are disposed more rearward than the projection parts 72.

The lever guards 66 comprise a left-lever guard 66L, which protects the left-projection part 72L, and a right-lever guard 66R, which protects the right-projection part 72R. A portion of the left-lever guard 66L is disposed more downward than the left-projection part 72L. A portion of the left-lever guard 66L is disposed more rearward than the left-projection part 72L. A portion of the right-lever guard 66R is disposed more downward than the right-projection part 72R. A portion of the right-lever guard 66R is disposed more rearward than the right-projection part 72R.

The amount by which the lever guards 66 protrude from the outer surface of the inlet pipe 34 in the left-right direction is larger than the amount by which the projection parts 72 protrude. Because objects surrounding the inlet pipe 34 are more likely to contact/strike the lever guards 66 than the projection parts 72, the projection parts 72 are protected (shielded) by the lever guards 66.

Inlet Pipe

Figure 28:
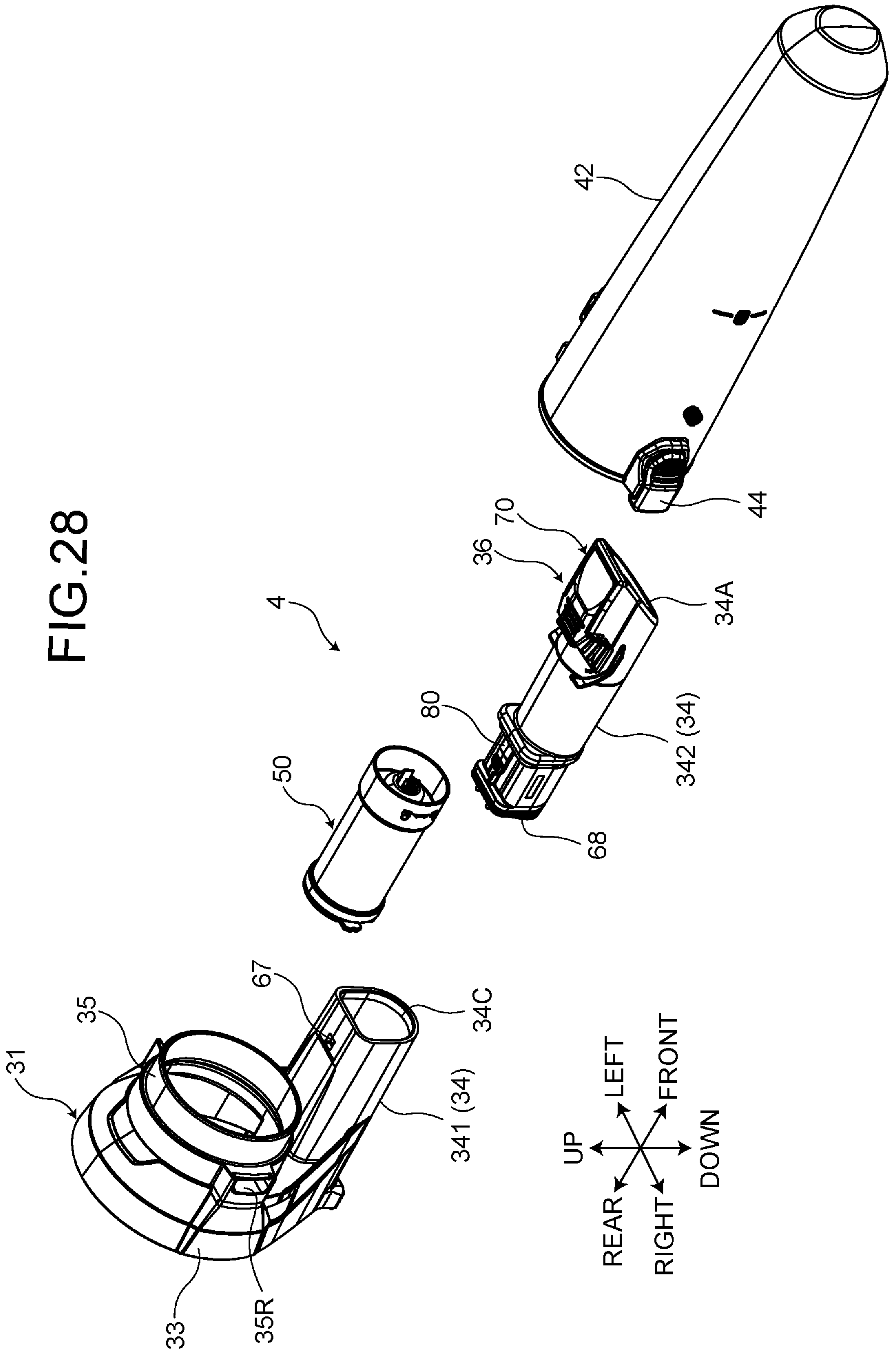
FIG. 28 is an exploded, oblique view, viewed from the front, that shows a portion of the dust-collecting assembly according to the embodiment.
Figure 29:
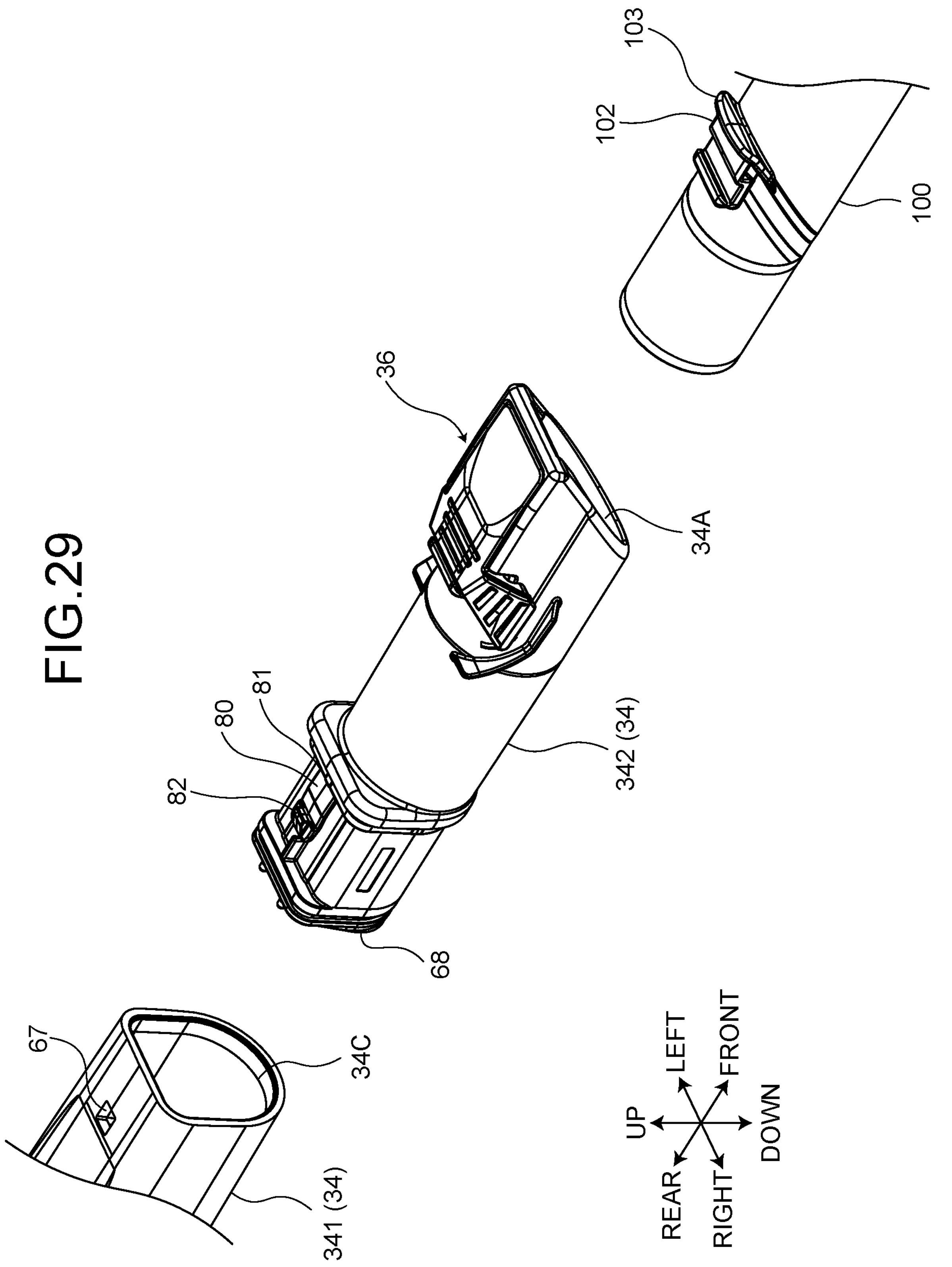
FIG. 29 is an exploded, oblique view, viewed from the front, that shows the inlet pipe according to the embodiment.
Figure 30:
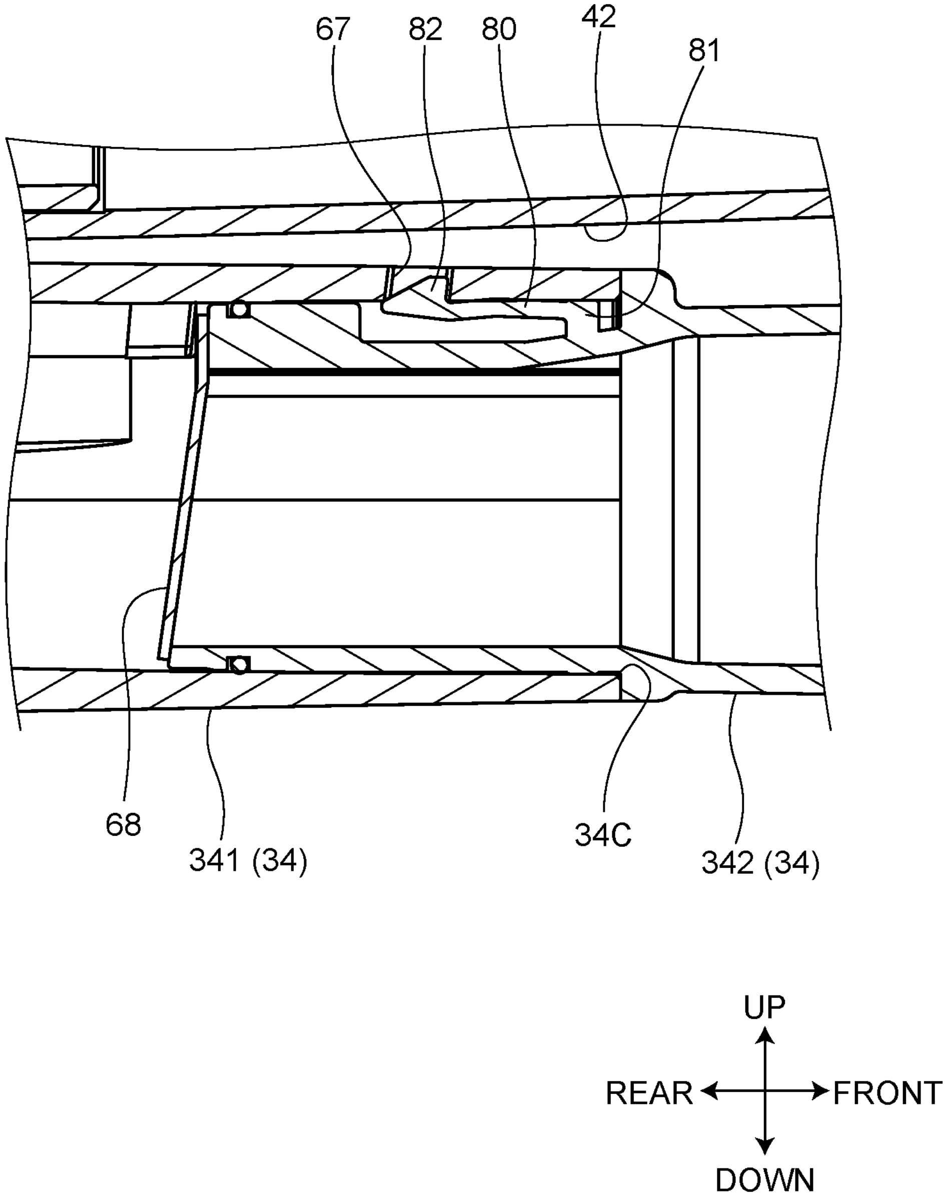
FIG. 30 is a cross-sectional view that shows the inlet pipe according to the embodiment.

FIG. 28 is an exploded, oblique view, viewed from the front, that shows a portion of the dust-collecting assembly 4 according to the embodiment. FIG. 29 is an exploded, oblique view, viewed from the front, that shows the inlet pipe 34 according to the embodiment. FIG. is a cross-sectional view that shows the inlet pipe 34 according to the embodiment.

In the embodiment, the inlet pipe 34 comprises a rear-inlet pipe 341, which is integral with the body part 33, and a front-inlet pipe 342, which is detachable from the rear-inlet pipe 341. The body part 33, the rear-inlet pipe 341, and the dust-cap-coupling-tube part are integral (a single member), i.e. without a break or seam therebetween.

An inlet-lock lever 80 is provided on the front-inlet pipe 342. The inlet-lock lever 80 is elongated in the front-rear direction. A front-end portion of the inlet-lock lever 80 is fixed to an inlet-support part 81, which is provided on the front-inlet pipe 342. The inlet-lock lever 80 can elastically deform in the state in which the inlet-lock lever 80 is supported on the inlet-support part 81. A rear-end portion of the inlet-lock lever 80 moves in the up-down direction in response to elastic deformation of the inlet-lock lever 80. An inlet-hook part 82, which protrudes upward, is provided at a rear-end portion of the inlet-lock lever 80.

An inlet through hole 67, into which the inlet-hook part 82 is inserted, is provided in the rear-inlet pipe 341. The inlet-lock lever 80 generates an elastic force such that the inlet-hook part 82 is inserted into the inlet through hole 67 from downward of the inlet through hole 67. The rear-inlet pipe 341 and the front-inlet pipe 342 are fixed to each other by inserting a rear-end portion of the front-inlet pipe 342 into an insertion opening 34C, which is provided in a front-end portion of the rear-inlet pipe 341, and by inserting the inlet-hook part 82 into the inlet through hole 67. The user can remove the inlet-hook part 82 from the inlet through hole 67 by pushing the inlet-hook part 82 in downward against the elastic force of the inlet-lock lever 80. The user can pull the front-inlet pipe 342 out from the rear-inlet pipe 341 by removing the inlet-hook part 82 from the inlet through hole 67.

For example, if foreign matter has adversely collected in the front housing 31 or in the rear-inlet pipe 341, the user can discharge the foreign matter from the front housing 31 or the rear-inlet pipe 341 in a simple manner by removing the front-inlet pipe 342 from the rear-inlet pipe 341.

In the embodiment, a check valve 68 is disposed in a rear-end portion of the front-inlet pipe 342. The check valve 68 allows movement of fluid from the front-inlet pipe 342 into the rear-inlet pipe 341 and obstructs movement of fluid from the rear-inlet pipe 341 into the front-inlet pipe 342, i.e. in the opposite direction. In the embodiment, the check valve 68 comprises a rubber plate, which is supported in the rear-end portion of the front-inlet pipe 342. An upper-end portion of the rubber plate is connected to the rear-end portion of the front-inlet pipe 342. Movement of fluid from the rear-inlet pipe 341 into the front-inlet pipe 342 is obstructed because the rubber plate plugs up the opening in the rear-end portion of the front-inlet pipe 342.

For example, when the suction unit 7 operates and a suction force is generated at the suction port 14, a lower-end portion of the check valve 68 is lifted up rearward. Thereby, the check valve 68 opens, and fluid moves from the front-inlet pipe 342 into the rear-inlet pipe 341. Thereafter, when the suction unit 7 stops and a suction force is no longer being generated at the suction port 14, the check valve 68 moves so as to plug up the opening in the rear-end portion of the front-inlet pipe 342. Thereby, the check valve 68 closes. By closing the check valve 68, for example, movement of foreign matter that has collected at the front housing 31 or the rear-inlet pipe 341 to the front-inlet pipe 342 is curtailed.

Method of Use

Next, an exemplary method of using the cleaner 1 will be explained. When the drive button 9B is manipulated (pressed) and the motor 7B operates, the fan 7A rotates. A suction force is generated at the suction port 14 by rotation of the fan 7A. By generating a suction force at the suction port 14, air, together with foreign matter, is suctioned from the inlet port of the suction nozzle 101 into the extension pipe 100. Foreign matter may include dust, debris, etc. Air that has flowed through the extension pipe 100 flows into the internal passageway of the inlet pipe 34 via the inflow port 34A of the inlet pipe 34. Air that has flowed through the internal passageway of the inlet pipe 34 flows out from the outflow port 34B of the inlet pipe 34.

The outflow port 34B of the inlet pipe 34 and the inflow port 35A of the cyclonic, dust-collecting unit 40 are fluidly connected via the swirling passageway 45, which is provided in the cyclone housing 30. Air that flows out from the outflow port 34B of the inlet pipe 34 flows through the swirling passageway 45, after which it flows into the cyclonic, dust-collecting unit 40 via the inflow port 35A.

The flowing of air into the cyclonic, dust-collecting unit 40 includes the flowing of air into the interior space of the dust cap 42. Air that has flowed into the interior space of the dust cap 42 via the swirling passageway 45 swirls in the interior space of the dust cap 42. Air and foreign matter are separated by centrifugal force in the dust cap 42. The foreign matter is deposited in the dust cap 42. The air that was separated from the foreign matter passes through the filter unit 50 and then flows out from the outflow port 53F of the cyclonic, dust-collecting unit 40. Air passes through the prefilter 51 and passes through the sound-absorbing member 52, after which it passes through the post filter 53 and flows out from the outflow port 53F, which is provided in the rear-end portion of the post filter 53.

The outflow port 53F of the cyclonic, dust-collecting unit 40 is connected to the interior space of the assembly-tube part 37. Air that has flowed out from the outflow port 53F of the cyclonic, dust-collecting unit 40 into the interior space of the assembly-tube part 37 flows into the filter 19 of the filter assembly 3. The filter 19 collects minute foreign matter that is not collected by the cyclonic, dust-collecting unit 40. Air that has flowed through the filter 19 flows into the interior space of the main-body housing 5 via the suction port 14. Air that has flowed into the interior space of the main-body housing 5 passes through the fan 7A and the motor 7B, after which it is discharged from (through) the air-exhaust ports 15 to the exterior of the main-body housing 5.

Effects

As explained above, in the above-described embodiment, the cyclonic, dust-collecting unit 40 comprises: the swirling members (air swirling members) 43, which swirl air; the dust cap (dust case) 42, into which air that has passed through the swirling members 43 flows; and the filter unit 50, through which air that flows out of the dust cap 42 passes. The filter unit 50 comprises: the prefilter 51; the sound-absorbing member 52, through which air that has passed through the prefilter 51 flows; and the post filter 53, through which air that has passed through the sound-absorbing member 52 flows.

According to the above-mentioned configuration, air that flows out of the dust cap 42 passes through the sound-absorbing member 52 before passing through the post filter 53. Therefore, air that swirls through the interior of the dust cap 42 does not directly contact the post filter 53. Consequently, noise generated by the post filter 53 is curtailed. In addition, air that flows out of the dust cap 42 passes through the prefilter 51 before passing through the sound-absorbing member 52. Consequently, adherence of foreign matter that is in the interior of the dust cap 42 to the sound-absorbing member 52 is curtailed.

In the embodiment, the prefilter 51 has the holes 51C through which air passes, the sound-absorbing member 52 has the holes 52A through which air passes, and the post filter 53 has the holes 53E through which air passes. The size of the holes 51C in the prefilter 51 is smaller than the size of the holes 52A in the sound-absorbing member 52. The size of the holes 52A in the sound-absorbing member 52 is smaller than the size of the holes 53E in the post filter 53.

According to the above-mentioned configuration, air that flows out of the dust cap 42 passes through the holes 52A in the sound-absorbing member 52, which is smaller than the holes 53E in the post filter 53, before passing through the holes 53E in the post filter 53. Noise generated by the post filter 53 is curtailed because the size of the holes 52A in the sound-absorbing member 52 is smaller than the size of the holes 53E in the post filter 53. In addition, air that flows out of the dust cap 42 passes through the holes 51C in the prefilter 51, which is smaller than the holes 52A in the sound-absorbing member 52, before passing through the holes 52A in the sound-absorbing member 52. Adherence of foreign matter that is in the interior of the dust cap 42 to the sound-absorbing member 52 is curtailed because the size of the holes 51C in the prefilter 51 is smaller than the size of the holes 52A in the sound-absorbing member 52.

In the embodiment, the post filter 53 comprises the filter-tube part 53A. The sound-absorbing member 52 is disposed around the filter-tube part 53A. At least a portion of the prefilter 51 is disposed around the sound-absorbing member 52.

According to the above-mentioned configuration, after air in the interior of the dust cap 42 has passed through the prefilter 51 and has passed through the sound-absorbing member 52, it can pass through the post filter 53. Noise generated by the post filter 53 is curtailed because the filter-tube part 53A of the post filter 53 is covered by the sound-absorbing member 52. Adherence of foreign matter that is in the interior of the dust cap 42 to the sound-absorbing member 52 is curtailed because the sound-absorbing member 52 is covered by the prefilter 51.

In the embodiment, the outer surface of the filter-tube part 53A and the inner surface of the sound-absorbing member 52 (directly) contact each other. The outer surface of the sound-absorbing member 52 and the inner surface of the prefilter 51 (directly) contact each other.

According to the above-mentioned configuration, the filter unit 50 may be embodied in a compact manner.

In the embodiment, the sound-absorbing member 52 is sandwiched between the prefilter 51 and the post filter 53.

According to the above-mentioned configuration, the sound-absorbing member 52 is fixed to both (secured or held between) the prefilter 51 and the post filter 53 by the sandwiching of the sound-absorbing member 52 between the prefilter 51 and the post filter 53.

In the embodiment, the post filter 53 comprises the filter-hook parts 53G, which are provided on the front-end portion, which is the one-end portion, of the filter-tube part 53A in the axial direction. The prefilter 51 comprises the filter-coupling part 51J, which is provided on the front-end portion, which is the one-end portion, of the prefilter 51 in the axial direction and on which the filter-hook parts 53G are hooked.

According to the above-mentioned configuration, the prefilter 51 and the post filter 53 are fixed (secured, held, latched) to each other by hooking the filter-hook parts 53G of the post filter 53 to (in) the filter-coupling part 51J of the prefilter 51.

In the embodiment, the prefilter 51, the sound-absorbing member 52, and the post filter 53 are separable from each other.

According to the above-mentioned configuration, the prefilter 51, the sound-absorbing member 52, and the post filter 53 can be separated by removing the filter-hook parts 53G from the filter-coupling part 51J. Then, the user of the cleaner 1 can more easily perform maintenance on (e.g., clean) the prefilter 51, the sound-absorbing member 52, and the post filter 53 by first separating the prefilter 51, the sound-absorbing member 52, and the post filter 53 before performing the maintenance, such as cleaning.

In the embodiment, the prefilter 51 comprises the circular-tube-shaped (hollow cylindrical) mesh member 51A.

According to the above-mentioned configuration, adherence of foreign matter that is in the interior of the dust cap 42 to the prefilter 51 is curtailed. However, even if foreign matter has adhered to a surface of the prefilter 51, the user of the cleaner 1 can easily remove the foreign matter that has adhered to the surface of the prefilter 51.

In the embodiment, the mesh member 51A is made of a nylon (polyamide).

According to the above-mentioned configuration, adherence of foreign matter that is in the interior of the dust cap 42 to the prefilter 51 is curtailed.

In the embodiment, the prefilter 51 comprises the filter frame 51B, which supports the mesh member 51A.

According to the above-mentioned configuration, deformation of the mesh member 51A is curtailed because the mesh member 51A is supported on the filter frame 51B.

In the embodiment, the mesh member 51A and the filter frame 51B are integrated as one body (e.g., a unit having the mesh member and filter frame attached to each other).

According to the above-mentioned configuration, changes in the relative position between the mesh member 51A and the filter frame 51B can be minimized or even eliminated.

In the embodiment, the filter frame 51B comprises: the first fixing part 51D, which is fixed to the front-end portion, which is the one-end portion, of the mesh member 51A in the axial direction; the second fixing part 51E, which is fixed to the rear-end portion, which is the other-end portion, of the mesh member 51A in the axial direction; and the frame-coupling parts 51F, which connect the first fixing part 51D and the second fixing part 51E.

According to the above-mentioned configuration, deformation of the mesh member 51A is curtailed. In addition, air in the interior of the dust cap 42 can pass through the mesh member 51A between the first fixing part 51D, the second fixing part 51E, and the frame-coupling parts 51F.

In the embodiment, the sound-absorbing member 52 comprises a circular-tube-shaped (hollow cylindrical) sponge member.

According to the above-mentioned configuration, noise generated by the post filter 53 can be curtailed effectively because the sound-absorbing member 52 is a sponge member. In addition, the user of the cleaner 1 can smoothly (easily) mount the sound-absorbing member 52 on the post filter 53.

In the embodiment, the sponge member is made of a foamed urethane.

According to the above-mentioned configuration, noise generated by the post filter 53 is curtailed effectively. In addition, the user of the cleaner 1 can smoothly (easily) mount the sound-absorbing member 52 on the post filter 53.

In the embodiment, the post filter 53 comprises the filter-tube part 53A and the filter-cover part 53B, which covers an opening in the front-end portion, which is the one-end portion, of the filter-tube part 53A in the axial direction. The holes 53E, through which air passes, are provided in the filter-tube part 53A.

According to the above-mentioned configuration, after air in the interior of the dust cap 42 has passed through the prefilter 51 and has passed through the sound-absorbing member 52, it can pass through the filter-tube part 53A of the post filter 53. Noise generated by the post filter 53 is curtailed because the filter-tube part 53A of the post filter 53 is covered by the sound-absorbing member 52. Adherence of foreign matter that is in the interior of the dust cap 42 to the sound-absorbing member 52 is curtailed because the sound-absorbing member 52 is covered by the prefilter 51.

In the embodiment, the air that has passed through the holes 53E in the filter-tube part 53A flows out of the outflow port 53F in the rear-end portion, which is the other-end portion, of the filter-tube part 53A in the axial direction.

According to the above-mentioned configuration, after air that has flowed into the dust cap 42 has flowed through the filter unit 50, it flows out of the outflow port 53F on the rear-end portion, which is the other-end portion, of the filter-tube part 53A in the axial direction.

In the embodiment, the post filter 53 is made from an acrylonitrile butadiene styrene (ABS) resin (polymer).

According to the above-mentioned configuration, sufficient strength of the filter unit 50 is ensured.

Other Embodiments

In the embodiment described above, it is assumed that the first fixing part 51D, the second fixing part 51E, and the frame-coupling parts 51F are integral (a single member), i.e. without a break or seam therebetween. However, one or more of the first fixing part 51D, the second fixing part 51E, and the frame-coupling parts 51F may instead be separate bodies. For example, the first fixing part 51D, the second fixing part 51E, and the frame-coupling parts 51F may be separable. In addition, the frame-coupling parts 51F may be omitted from the filter frame 51B. The filter frame 51B may comprise the first fixing part 51D and the second fixing part 51E alone.

In the embodiment described above, it is assumed that the cleaner 1 is a cyclonic cleaner. The cleaner 1 does not have to be a cyclonic cleaner and may separate foreign matter from air using a technique that does not involve centrifugal force.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved vacuum cleaners and components thereof.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

EXPLANATION OF THE REFERENCE NUMBERS

1 Cleaner (Stick vacuum cleaner)
2 Main-body assembly
3 Filter assembly
4 Dust-collecting assembly
5 Main-body housing
5L Left housing
5R Right housing
5S Screw
6 Battery-mounting part
7 Suction unit
7A Fan
7B Motor
7C Motor case
7D Opening
7E Rib
8 Controller
9 Operation panel
9A Drive-mode changing button
9B Drive button
9C Light-emitting part
10 Light
11 Body part
11A Side-plate part
11B Front-plate part
11C Inner-tube part
11D Outer-tube part
11E Groove
11F Protruding part
11G Groove
12 Grip part
13 Battery-holding part
14 Suction port
15 Air-exhaust port
16 Sound-absorbing member
17 Battery pack
18 Support frame
19 Filter
21 Filter-fixing member
22 Retaining-rib member
22A Fixing part
22B Lip part
23 First lattice part
23A First ring part
23B First rod part
24 Second lattice part
24A Second ring part
24B Third ring part
24C Second rod part
24D Third rod part
25 Front-side tube part
26 Rear-side tube part
27 Support-rib part
28 Engaging-protruding part
29 Assembly-support part
30 Cyclone housing
31 Front housing
32 Rear housing
33 Body part
34 Inlet pipe
34A Inflow port
34B Outflow port
34C Insertion opening
35 Dust-cap-coupling-tube part
35A Inflow port
35R Recessed part
36 Lock mechanism
37 Assembly-tube part
38 Assembly-plate part
39 Filter-unit-coupling-tube part
39A Support part
39B Notch
40 Cyclonic, dust-collecting unit
42 Dust cap
43 Swirling member
43A First swirling member
43B Second swirling member
44 Lock part
45 Swirling passageway
50 Filter unit
51 Prefilter
51A Mesh member
51B Filter frame
51C Hole
51D First fixing part
51E Second fixing part
51F Frame-coupling part

51G Circular-tube part
51H Circular-ring part
51J Filter-coupling part
51K Hole
51L Recessed part
52 Sound-absorbing member
52A Hole
53 Post filter
53A Filter-tube part
53B Filter-cover part
53C First fixing-plate part
53D Second fixing-plate part
53E Hole
53F Outflow port
53G Filter-hook part
53H Filter-protruding part
60 Screw
61 Screw hole
62 Opening
63 Coil spring
64 Pipe through hole
65 Support-recessed part
66 Lever guard
66L Left-lever guard
66R Right-lever guard
67 Inlet through hole
68 Check valve
70 Pipe-lock lever
71 Main-body part
72 Projection part
72L Left-projection part
72R Right-projection part
73 Pipe-hook part
74 Support-protruding part
75 Anti-slip rib
76 Anti-slip rib
80 Inlet-lock lever
81 Inlet-support part
82 Inlet-hook part
100 Extension pipe
101 Suction nozzle
102 Engaging part
103 Protruding part
104 Pipe-recess part
341 Rear-inlet pipe
342 Front-inlet pipe
AX Rotational axis
RX Pivot axis

The invention claimed is:

1. A cyclonic, dust-collecting unit comprising:

one or more air swirling members, which swirl(s) air;

a dust cap, into which air that has passed through the swirling member(s) flows; and a filter unit, through which air that flows out of the dust cap passes;

wherein:

the filter unit comprises: a prefilter; a sound-absorbing member, through which air that has passed through the prefilter flows; and a post filter comprising a filter-tube part, a filter-cover part that covers an opening at a front-end portion of the filter-tube part, and one or more filter-hook parts provided on and extending forward from a front surface of the filter-cover part in the axial direction, through which air that has passed through the sound-absorbing member flows;

the sound-absorbing member is sandwiched between the prefilter and the post filter in a radial direction of the filter-tube part;

the prefilter comprises a filter-coupling part provided on a front-end portion of the prefilter in the axial direction and on which the filter-hook part(s) is (are) hooked;

the prefilter and the post filter are fixable to each other by hooking the filter-hook part(s) of the post filter onto the filter-coupling part of the prefilter;

a rear-end portion of the post filter is located closer to the one or more swirling members than the front-end portion of the post filter; and the prefilter, the sound-absorbing member, and the post filter are separable from each other by detaching the filter-hook part(s) from the filter-coupling part.

2. The cyclonic, dust-collecting unit according to claim 1, wherein:

an outer surface of the filter-tube part and an inner surface of the sound-absorbing member directly contact each other; and an outer surface of the sound-absorbing member and an inner surface of the prefilter directly contact each other.

3. The cyclonic, dust-collecting unit according to claim 2, wherein:

the prefilter comprises a circular-tube-shaped mesh member made of a nylon and a filter frame, which supports the mesh member;

the sound-absorbing member comprises a circular-tube-shaped sponge member made of urethane; and the post filter is made of acrylonitrile butadiene styrene (ABS).

4. The cyclonic, dust-collecting unit according to claim 3, wherein:

the filter frame comprises: a first fixing part, which is fixed to one-end portion of the mesh member in the axial direction; a second fixing part, which is fixed to the other-end portion of the mesh member in the axial direction; and a frame-coupling part, which connects the first fixing part and the second fixing part;

a hole, through which air passes, is provided in the filter-tube part; and the filter unit is configured such that the air that has passed through the hole in the filter-tube part flows out of an outflow port in a rear-end portion of the filter-tube part in the axial direction.

5. The cyclonic, dust-collecting unit according to claim 1, wherein the prefilter comprises a circular-tube-shaped mesh member.

6. The cyclonic, dust-collecting unit according to claim 5, wherein:

the mesh member is made of a nylon; and the prefilter comprises a filter frame, which supports the mesh member.

7. The cyclonic, dust-collecting unit according to claim 6, wherein the mesh member and the filter frame are integrated as one body.

8. The cyclonic, dust-collecting unit according to claim 6, wherein the filter frame comprises: a first fixing part, which is fixed to one-end portion of the mesh member in the axial direction; a second fixing part, which is fixed to the other-end portion of the mesh member in the axial direction; and a frame-coupling part, which connects the first fixing part and the second fixing part.

9. The cyclonic, dust-collecting unit according to claim 1, wherein:

the sound-absorbing member comprises a circular-tube-shaped sponge member; and the sponge member is made of a urethane.

10. The cyclonic, dust-collecting unit according to claim 1, wherein:

a hole, through which air passes, is provided in the filter-tube part.

11. The cyclonic, dust-collecting unit according to claim 10, wherein the filter unit is configured such that the air that has passed through the hole in the filter-tube part flows out of an outflow port in a rear-end portion of the filter-tube part in the axial direction.

12. The cyclonic, dust-collecting unit according to claim 10, wherein the post filter is made of acrylonitrile butadiene styrene (ABS).

13. A vacuum cleaner comprising the cyclonic, dust-collecting unit according to claim 1.

14. A cyclonic, dust-collecting unit comprising:

one or more air swirling members, which swirl(s) air;

a dust cap, into which air that has passed through the swirling member(s) flows; and a filter unit, through which air that flows out of the dust cap passes;

wherein:

the filter unit comprises: a prefilter; a sound-absorbing member, through which air that has passed through the prefilter flows; and a post filter, through which air that has passed through the sound-absorbing member flows;

the prefilter, the sound-absorbing member, and the post filter each have holes through which air passes;

the size of the holes in the prefilter is smaller than the size of the holes in the sound-absorbing member;

the size of the holes in the sound-absorbing member is smaller than the size of the holes in the post filter;

the post filter comprises a filter-tube part and a filter-cover part covering an opening at a front-end portion of the filter-tube part;

the sound-absorbing member is disposed around the filter-tube part;

at least a portion of the prefilter is disposed around the sound-absorbing member;

the post filter comprises one or more filter-hook parts provided on and protruding forward from a front surface of the filter-cover part in the axial direction;

a rear-end portion of the post filter is located closer to the one or more swirling members than the front-end portion of the post filter; and the prefilter comprises a filter-coupling part provided on a front-end portion of the prefilter in the axial direction and on which the filter-hook part(s) is (are) hooked.

15. The cyclonic, dust-collecting unit according to claim 14, wherein:

the sound-absorbing member is sandwiched between the prefilter and the post filter in a radial direction of the filter-tube part;

the prefilter and the post filter are fixable to each other by hooking the filter-hook part(s) of the post filter onto the filter-coupling part of the prefilter; and the prefilter, the sound-absorbing member, and the post filter are separable from each other by detaching the filter-hook part(s) from the filter-coupling part.

16. The cyclonic, dust-collecting unit according to claim 15, wherein:

the prefilter, the sound-absorbing member, and the post filter each have holes through which air passes;

the size of the holes in the prefilter is smaller than the size of the holes in the sound-absorbing member; and the size of the holes in the sound-absorbing member is smaller than the size of the holes in the post filter.

17. The cyclonic, dust-collecting unit according to claim 16, wherein:

the post filter comprises a filter-tube part;

the sound-absorbing member is disposed around the filter-tube part; and at least a portion of the prefilter is disposed around the sound-absorbing member.

18. A cyclonic, dust-collecting unit comprising:

one or more air swirling members, which swirl(s) air;

a dust cap, into which air that has passed through the swirling member(s) flows; and a filter unit, through which air that flows out of the dust cap passes;

wherein:

the filter unit comprises: a prefilter; a sound-absorbing member, through which air that has passed through the prefilter flows; and a post filter comprising a filter-tube part and one or more filter-hook parts provided at one-end portion of the filter-tube part in the axial direction, through which air that has passed through the sound-absorbing member flows;

the sound-absorbing member is disposed around the filter-tube part;

at least a portion of the prefilter is disposed around the sound-absorbing member;

the prefilter comprises a filter-coupling part provided on one-end portion of the prefilter in the axial direction and on which the filter-hook part(s) is hooked;

the prefilter, the sound-absorbing member, and the post filter are separable from each other;

the filter-hook part(s) is (are) snap-fit connected to the filter-coupling part;

the one-end portion of the filter-tube part is a front-end portion of the post filter;

the one-end portion of the filter-coupling part is a front-end portion of the prefilter;

the filter-hook part(s) protrude(s) forward from a front surface of a filter-cover part; and a rear-end portion of the post filter is located closer to the one or more swirling members than the front-end portion of the post filter.

19. The cyclonic, dust-collecting unit according to claim 18, wherein:

the prefilter, the sound-absorbing member, and the post filter each have holes through which air passes;

the size of the holes in the prefilter is smaller than the size of the holes in the sound-absorbing member; and the size of the holes in the sound-absorbing member is smaller than the size of the holes in the post filter.

* * * * *